United States Patent
Su et al.

(10) Patent No.: US 12,220,782 B2
(45) Date of Patent: Feb. 11, 2025

(54) CUTTING APPARATUS

(71) Applicant: DISCO CORPORATION, Tokyo (JP)

(72) Inventors: Zhibo Su, Tokyo (JP); Kazuki Terada, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 133 days.

(21) Appl. No.: 17/647,065

(22) Filed: Jan. 5, 2022

(65) Prior Publication Data

US 2022/0234156 A1    Jul. 28, 2022

(30) Foreign Application Priority Data

Jan. 28, 2021    (JP) .................... 2021-012279

(51) Int. Cl.
| | |
|---|---|
| B23Q 3/157 | (2006.01) |
| B24B 27/06 | (2006.01) |
| B24B 41/04 | (2006.01) |
| B24B 45/00 | (2006.01) |
| B24B 49/00 | (2012.01) |

(Continued)

(52) U.S. Cl.
CPC .......... B24B 27/0683 (2013.01); B24B 41/04 (2013.01); B24B 49/12 (2013.01); B24B 53/12 (2013.01); B24B 55/04 (2013.01); B28D 5/022 (2013.01); *B23Q 3/15546* (2013.01); *B23Q 3/15713* (2013.01); *B23Q 11/08* (2013.01); *B23Q 13/00* (2013.01);

(Continued)

(58) Field of Classification Search
CPC ............. Y10T 483/174; Y10T 483/115; Y10T 483/13; Y10T 483/132; Y10T 483/134; B23Q 11/08; B23Q 3/15546; B24B 53/017; B24B 53/12

See application file for complete search history.

(56) References Cited

U.S. PATENT DOCUMENTS

2018/0200866 A1* 7/2018 Sekiya .................... H01L 21/78
2018/0307199 A1* 10/2018 Sekiya ............... G06Q 30/0633

(Continued)

FOREIGN PATENT DOCUMENTS

| JP | 2007098536 A | 4/2007 |
| JP | 2020203358 A | 12/2020 |

OTHER PUBLICATIONS

Search report issued in counterpart Singapore patent application No. 10202114440Y, dated Jan. 5, 2023.

(Continued)

*Primary Examiner* — Erica E Cadugan
*Assistant Examiner* — Eric Daniel Whitmire
(74) *Attorney, Agent, or Firm* — Greer Burns & Crain Ltd.

(57) ABSTRACT

A cutting apparatus includes a cutting unit including a spindle as a rotational shaft and a mount flange for mounting a cutting blade thereon, the mount flange being fixed to a distal end of the spindle, a support unit for supporting a cutting blade housed in a blade case, the support unit including a blade case support for supporting the blade case for housing the cutting blade therein, a changing mechanism for dismounting a cutting blade that has been mounted on the mount flange from the mount flange and mounting the cutting blade that has been supported on the support unit on the mount flange, and a moving mechanism for moving the changing mechanism between a changing position, a blade transfer position, and a retracted position.

19 Claims, 20 Drawing Sheets

(51) Int. Cl.
  *B24B 49/12*   (2006.01)
  *B24B 53/12*   (2006.01)
  *B24B 55/04*   (2006.01)
  *B28D 5/02*    (2006.01)
  B23Q 3/155    (2006.01)
  B23Q 11/08    (2006.01)
  B23Q 13/00    (2006.01)

(52) U.S. Cl.
  CPC ........ *Y10T 483/115* (2015.01); *Y10T 483/134* (2015.01); *Y10T 483/174* (2015.01)

(56)           References Cited

U.S. PATENT DOCUMENTS

2019/0358757 A1*  11/2019  Terada .................. B28D 5/0082
2020/0398452 A1   12/2020  Terada

OTHER PUBLICATIONS

Office Action issued in counterpart Japanese patent application No. 2121-012279, dated Aug. 21, 2024.

* cited by examiner

CUTTING APPARATUS

BACKGROUND OF THE INVENTION

Field of the Invention

The present invention relates to a cutting apparatus for cutting a workpiece with a cutting blade.

Description of the Related Art

Wafers with a plurality of devices, typically semiconductor integrated circuits, formed thereon are divided to produce a plurality of device chips that each include the device. After a plurality of device chips are mounted on a predetermined board, the device chips on the board are covered with a sealing material, e.g., molded resin, so that a package board is fabricated. The package board is divided to produce package devices each including one or more of the device chips. The package devices will be incorporated in various electronic appliances such as mobile phones and personal computers.

A cutting apparatus is used to divide a workpiece such as a wafer or a package board. The cutting apparatus includes a chuck table for holding the workpiece thereon and a cutting unit for cutting the workpiece on the chuck table. The cutting unit includes a spindle, a mount flange fixed to the distal end of the spindle, and an annular cutting blade for cutting the workpiece, the cutting blade being mounted on the mount flange.

The mount flange includes a boss inserted into an opening defined centrally in the cutting blade. The cutting blade is secured to the mount flange by a nut threaded and tightened over the boss that has been inserted into the opening in the cutting blade. When the spindle is rotated about its central axis with the cutting blade mounted on the mount flange, the cutting blade is rotated about its central axis. The rotating cutting blade is caused to cut into the workpiece held on the chuck table, the workpiece is cut and divided.

The cutting blade is progressively worn as it cuts workpieces one after another and is eventually replaced with a new one when necessary. For replacing the worn cutting blade, the nut is loosened and detached from the boss, and the cutting blade is dismounted from the mount flange. Then, a replacement cutting blade, e.g., an unused cutting blade, is mounted on the mount flange and thereafter secured to the mount flange by threading and tightening the nut over the boss.

It has been customary to replace worn cutting blades manually. However, the manual replacement process is tedious and time-consuming, and has also proven disadvantageous in that an operator may drop cutting blades or the nut or may happen to hit them on the cutting apparatus. Consequently, in order to replace cutting blades without a manual replacement process, there has been proposed a cutting apparatus incorporating therein a changing device for automatically replacing a cutting blade on a cutting unit, i.e., a spindle unit (see, for example, JP 2007-98536A).

The changing device of the cutting apparatus includes a cutting blade mounting and dismounting mechanism for mounting and dismounting cutting blades and a nut mounting and dismounting mechanism for mounting and dismounting a nut for securing a cutting blade to a cutting unit. The cutting blade mounting and dismounting mechanism includes a first holder for gripping a cutting blade mounted on a spindle and a second holder for gripping a replacement cutting blade with which to replace the cutting blade mounted on the spindle.

SUMMARY OF THE INVENTION

In the cutting apparatus, the second holder of the cutting blade mounting and dismounting mechanism grips a replacement cutting blade housed in a blade stocker of the cutting apparatus and mounts the replacement cutting blade on a spindle. The blade stocker has a shaft to be inserted into an opening in the replacement cutting blade. After the replacement cutting blade is manually removed from a blade case where it has been housed, the replacement cutting blade is manually placed on the shaft and housed in the blade stocker.

However, when the operator manually removes the replacement cutting blade from the blade case and manually place the replacement cutting blade into the blade stocker, the operator may drop the replacement cutting blade or a nut or may happen to hit them on the cutting apparatus.

It is therefore an object of the present invention to provide a cutting apparatus that makes it unnecessary for the operator to manually remove a cutting blade from a blade case.

In accordance with an aspect of the present invention, there is provided a cutting apparatus including a cutting unit including a spindle as a rotational shaft and a mount flange for mounting a cutting blade thereon, the mount flange being fixed to a distal end of the spindle, a support unit for supporting a cutting blade housed in a blade case, the support unit including a blade case support for supporting the blade case for housing the cutting blade therein, a changing mechanism for dismounting a cutting blade that has been mounted on the mount flange from the mount flange and mounting the cutting blade that has been supported on the support unit on the mount flange, and a moving mechanism for moving the changing mechanism between a changing position in which the cutting blade is able to be mounted on and dismounted from the mount flange, a blade transfer position in which the cutting blade is able to be transferred to and from the support unit, and a retracted position spaced from the changing position and the blade transfer position.

According to the aspect of the present invention, the support unit may further include a rotating mechanism for rotating the blade case support and have a plurality of the blade case supports for supporting respective blade cases, the blade case supports being arrayed along directions in which the blade case supports are rotatable by the rotating mechanism.

According to the aspect of the present invention, the mount flange may have a fixed mount fixed to the spindle and a holder flange mounted on the fixed mount with the cutting blade sandwiched and secured between the fixed mount and the holder flange, the support unit may further include a holder flange support for supporting the holder flange, and the changing mechanism may mount the cutting blade together with the holder flange on the fixed mount and dismount the cutting blade together with the holder flange from the fixed mount.

According to the aspect of the present invention, the blade case may have a storage casing for storing the cutting blade and a lid for closing the storage casing, and the cutting apparatus may further include an opening and closing unit for opening and closing the lid of the blade case.

According to the aspect of the present invention, the cutting apparatus may further include a table for holding a dressing board for use in dressing the cutting blade or an inspection board for being cut by the cutting blade to form an inspection groove therein. The support unit may further include a board support for supporting the dressing board or the inspection board. The moving mechanism may move the changing mechanism between a board transfer position in which the dressing board or the inspection board is able to be transferred to and from the support unit, a loading and unloading position in which the dressing board or the inspection board is able to be loaded to and unloaded from the table, the changing position, the blade transfer position, and the retracted position, and the changing mechanism may remove the dressing board or the inspection board from the table on which the dressing board or the inspection board has been held, and place, on the table, the dressing board or the inspection board that has been supported on the support unit.

According to the aspect of the present invention, the cutting apparatus may further include a reading unit for reading identification marks, and a blade case determining unit for determining whether information acquired when an identification mark attached to the cutting blade is read by the reading unit and information acquired when an identification mark attached to the blade case is read by the reading unit correspond to each other or not.

According to the aspect of the present invention, the cutting apparatus may further include a reading unit for reading identification marks, and a board determining unit for determining whether information acquired when an identification mark attached to the cutting blade is read by the reading unit and information acquired when an identification mark attached to the dressing board or the inspection board is read by the reading unit correspond to each other or not.

The cutting apparatus according to the aspect of the present invention includes a support unit for supporting a cutting blade housed in a blade case, a cutting unit including a mount flange on which the cutting blade is to be mounted, a changing mechanism for mounting a cutting blade that has been supported on a support unit on the mount flange, and a moving mechanism for moving the changing mechanism.

Consequently, by supporting a cutting blade housed in a blade case on the support unit and moving the changing mechanism with the moving mechanism, it is possible to change the cutting blade on the cutting unit. In other words, the cutting apparatus according to the aspect of the present invention makes it unnecessary to manually remove the cutting blade from the blade case as in the existing technology.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
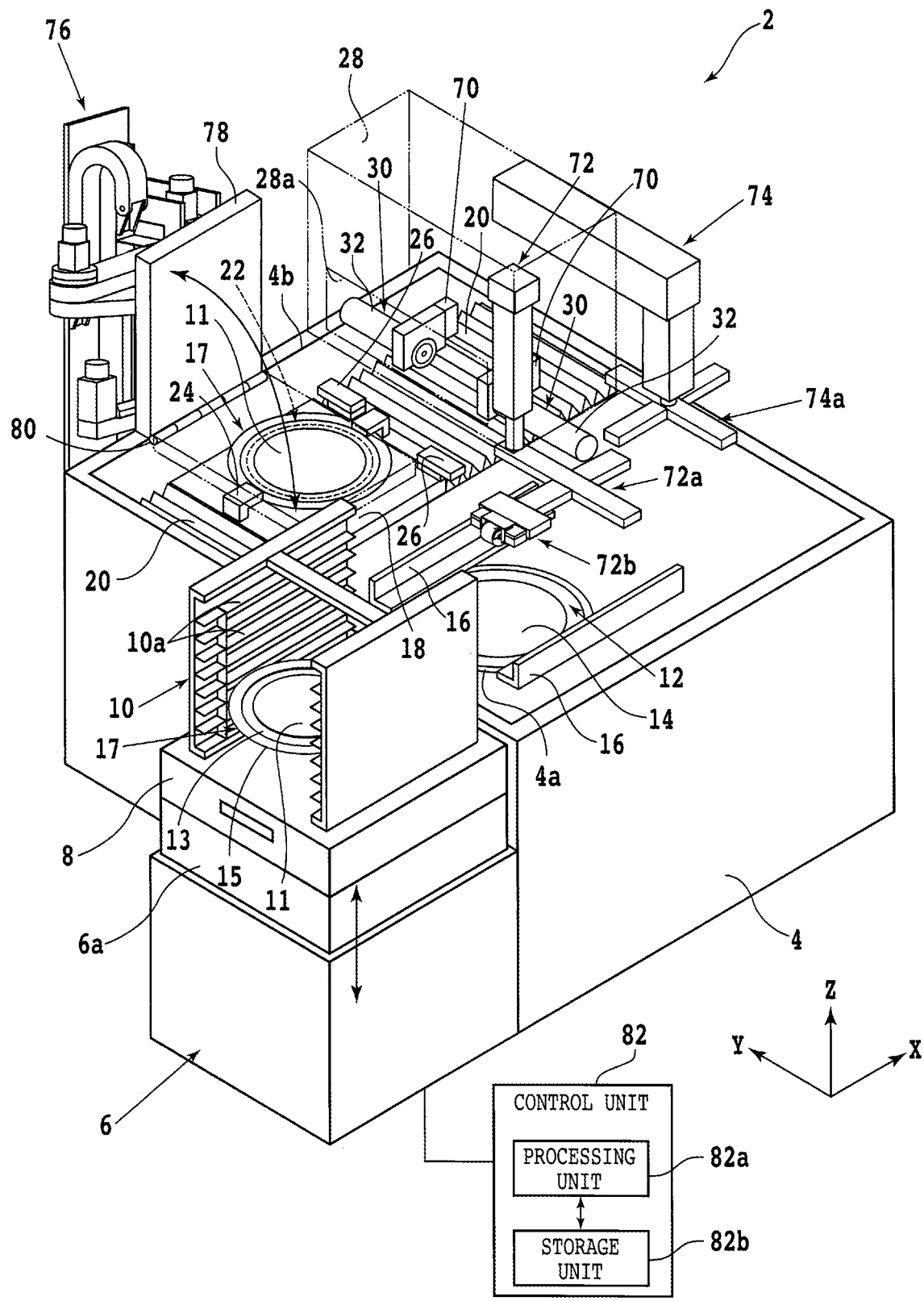
FIG. 1 is a perspective view of a cutting apparatus according to a preferred embodiment of the present invention.

A preferred embodiment of the present invention will be described hereinbelow with reference to the accompanying drawings. FIG. 1 illustrates in perspective a cutting apparatus 2 according to the preferred embodiment of the present invention. In FIG. 1, X-axis directions, i.e., processing feed directions, first horizontal directions, or forward and rearward directions, and Y-axis directions, i.e., indexing feed directions, second horizontal directions, or leftward and rightward directions, extend perpendicularly to each other. Z-axis directions, i.e., vertical directions, upward and downward directions, or heightwise directions, expend perpendicularly to the X-axis directions and the Y-axis directions.

The cutting apparatus 2 includes a base 4 supporting or housing various components of the cutting apparatus 2. An elevator 6 having a lifting and lowering stage 6a is disposed on one side of a front corner of the base 4. The elevator 6 includes a lifting and lowering mechanism, not depicted, for lifting and lowering the lifting and lowering stage 6a along the Z-axis directions.

On the lifting and lowering stage 6a of the elevator 6, there are disposed a container 8 for containing various tools (parts, consumables, etc.) used on the cutting apparatus 2 and a cassette 10 for housing a plurality of workpieces 11 to be cut by the cutting apparatus 2. In FIG. 1, the container 8 is illustrated as being placed on the lifting and lowering stage 6a, and the cassette 10 is illustrated as being placed on the container 8. The tools to be placed in the container 8 will be described in detail later.

The cassette 10 has a pair of side walls that are spaced from each other and face each other along the Y-axis directions. A plurality of guide rails 10a that are spaced at predetermined intervals along the heightwise directions of the cassette 10 are fixed to each of confronting inner surfaces of the side walls of the cassette 10. Frame units, i.e., workpiece units, 17 that include the respective workpieces 11 are supported by respective pairs of the guide rails 10a that are positioned at respective vertical positions in the cassette 10.

Each of the workpieces 11 is a disk-shaped wafer made of a semiconductor material such as silicon, for example. Each of the workpieces 11 has a face side, i.e., an upper surface, having a plurality of areas demarcated by a grid of projected dicing lines or streets established thereon. Devices such as integrated circuits (ICs) or large-scale-integration (LSI) circuits are formed on the face sides or upper surfaces of the respective areas of each of the workpieces 11. Each of the workpieces 11 will be cut and divided along the projected dicing lines into a plurality of device chips that each include the device.

There are no limitations on the material, shape, structure, size, and so on of the workpieces 11. The workpieces 11 may be wafers made of a semiconductor material other than silicon, such as GaAs, InP, GaN, or Sic, glass, ceramic, resin, metal, or the like, for example. There are no limitations on the kind, number, shape, structure, size, layout, or the like of the devices on the workpieces 11, and the workpieces 11 may be devoid of devices. Further, the workpieces 11 may be package boards such as chip-size-package (CSP) boards or quad-flat-non-leaded-package (QFN) boards.

A circular tape, or a dicing tape, 13 is affixed to the reverse side, i.e., the lower surface, of each of the workpiece 11. The tape 13 is larger in diameter than the workpiece 11. The tape 13 may include a sheet having a circular film base and an adhesive layer, i.e., a glue layer, disposed on the film base. For example, the film base is made of a resin such as polyolefin, polyvinyl chloride, or polyethylene terephthalate, and the adhesive layer is made of an epoxy, acrylic, or rubber adhesive or the like. Alternatively, the adhesive layer may be made of an ultraviolet-curable resin that can be cured upon exposure to ultraviolet radiation.

The tape 13 has an outer circumferential portion affixed to an annular frame 15 made of metal or the like and having a circular opening defined centrally therein. The opening in the frame 15 is larger in diameter than the workpiece 11, which is disposed within the opening in the frame 15.

When the tape 13 is affixed to the workpiece 11 and the frame 15, the workpiece 11 is supported on the frame 15 by the tape 13, thereby making up a frame unit 17 including the workpiece 11, the tape 13, and the frame 15. One or more frame units 17 are housed in the cassette 10.

The base 4 has an opening 4a defined in a region of an upper surface thereof that is positioned adjacent to the elevator 6 along the X-axis directions. The opening 4a accommodates therein a cleaning unit 12 for cleaning a workpiece 11. The cleaning unit 12 includes a spinner table 14 for holding the workpiece 11 thereon and a nozzle, not depicted, disposed above the spinner table 14 for supplying a cleaning fluid such as pure water to the workpiece 11 held on the spinner table 14.

The spinner table 14 is connected to a rotary actuator, not depicted, such as an electric motor for rotating the spinner table 14 about a rotational axis generally parallel to the Z-axis directions. While the workpiece 11 is being held on the spinner table 14, the spinner table 14 is rotated about the rotational axis by the rotary actuator and the cleaning fluid is supplied from the nozzle to the workpiece 11 on the spinner table 14, thereby cleaning the workpiece 11. The cleaning fluid may alternatively be a gas-liquid fluid made up of a mixture of a liquid such as pure water and air.

A pair of guide rails 16 extending along the X-axis directions for holding a frame unit 17 thereon are disposed above the cleaning unit 12. The guide rails 16 are operatively connected to a moving mechanism, not depicted, for moving the guide rails 16 away from and toward each other along the Y-axis directions. The moving mechanism can move the guide rails 16 toward each other to sandwich the frame unit 17 on the guide rails 16, thereby positioning the frame unit 17 along the Y-axis directions.

The base 4 also has a rectangular opening 4b defined in another region of the upper surface thereof that is positioned adjacent to the guide rails 16 along the Y-axis directions. The opening 4b has its longitudinal axis oriented along the X-axis directions. The opening 4b accommodates therein a table cover 18 shaped as a flat plate. Dust-proof and dripproof covers 20 in the form of bellows that extensible and contractible in the X-axis directions are disposed on both sides of the table cover 18 and joined thereto in the X-axis directions.

A chuck table, i.e., a holding table, 22 for holding a workpiece 11, etc. is disposed on the table cover 18. The chuck table 22 has an upper surface providing a flat holding surface for holding the workpiece 11, etc. thereon. The chuck table 22 is surrounded by a plurality of clamps 24 for gripping the frame 15 that supports the workpiece 11 to secure the frame 15 in position on the chuck table 22.

The chuck table 22 includes a cylindrical frame, not depicted, made of metal such as stainless steel, for example. The frame has a circular recess defined centrally in an upper surface thereof. A disk-shaped porous member made of a porous material such as porous ceramic is fitted in the circular recess in the frame. The holding surface of the chuck table 22 that is mainly provided by the porous member is held in fluid communication with a suction source, not depicted, such as an ejector via a fluid channel, not depicted, defined in the porous member and the chuck table 22, a valve, not depicted, etc.

A frame unit 17 is placed on the chuck table 22 such that the face side of the workpiece 11 is exposed upwardly and the reverse side thereof, i.e., the tape 13 side, faces the holding surface of the chuck table 22. The frame 15 is gripped and fixed in position by the clamps 24. Then, a negative pressure from the suction source is applied to the holding surface of the chuck table 22, attracting and holding the workpiece 11 on the chuck table 22 under suction with the tape 13 interposed therebetween.

A pair of sub-tables, i.e., holding tables, 26 are mounted on the table cover 18 adjacent to the chuck table 22. The sub-tables 26 are spaced from each other along the Y-axis directions behind the chuck table 22.

The sub-tables 26 have respective flat upper surfaces providing holding surfaces for holding plate-shaped members to be used for setting up, inspecting, and assessing a cutting process. For example, the holding surfaces of the sub-tables 26 are of a rectangular shape and are held in fluid communication with a suction source, not depicted, such as an ejector via fluid channels, not depicted, defined in the sub-tables 26, valves, not depicted, etc. Specifically, the sub-tables 26 hold thereon a dressing board 19, an inspection board (see FIG. 10A, etc.), etc. to be described later.

A moving unit, not depicted, and a rotary actuator, not depicted, are disposed in the base 4 below the table cover 18. The moving unit includes a ball-screw-type moving mechanism or the like for moving the chuck table 22 and the sub-tables 26 as well as the table cover 18 along the X-axis directions. The rotary actuator includes an electric motor or the like for rotating the chuck table 22 about a rotational axis generally parallel to the Z-axis directions.

The opening 4b has a front region positioned adjacent to the opening 4a and providing a delivery region where a workpiece 11 can be loaded to and unloaded from the chuck table 22. The opening 4b also has a rear region positioned behind the delivery region and providing a processing region where a workpiece 11 can be processed, i.e., cut. The moving unit moves the chuck table 22 and the sub-tables 26 as well as the table cover 18 along the X-axis directions to position the chuck table 22 and the sub-tables 26 selectively in the delivery region and the processing region.

A processing chamber cover 28 is disposed above the processing region to define a space, i.e., a processing chamber, where a workpiece 11 on the chuck table 22 is processed, i.e., cut. In FIG. 1, the processing chamber cover 28 has its outline indicated by the two-dot-and-dash lines. The processing chamber cover 28 is made of metal or the like and shaped as a rectangular parallelepiped, and is disposed in covering relation to the processing region. The processing chamber cover 28 has an inlet/outlet port, i.e., an opening, 28a defined in a front side wall thereof facing the delivery region, for allowing a changing device 100 (see FIG. 6, for example), to be described later, to pass therethrough.

The processing chamber cover 28 houses therein a pair of cutting units 30 for cutting a workpiece 11. The cutting units 30 cut the workpiece 11 by causing respective annular cutting blades to rotate and cut into the workpiece 11. A hub-type cutting blade 36 (see FIG. 2), for example, is mounted on each of the cutting units 30.

Figure 2:
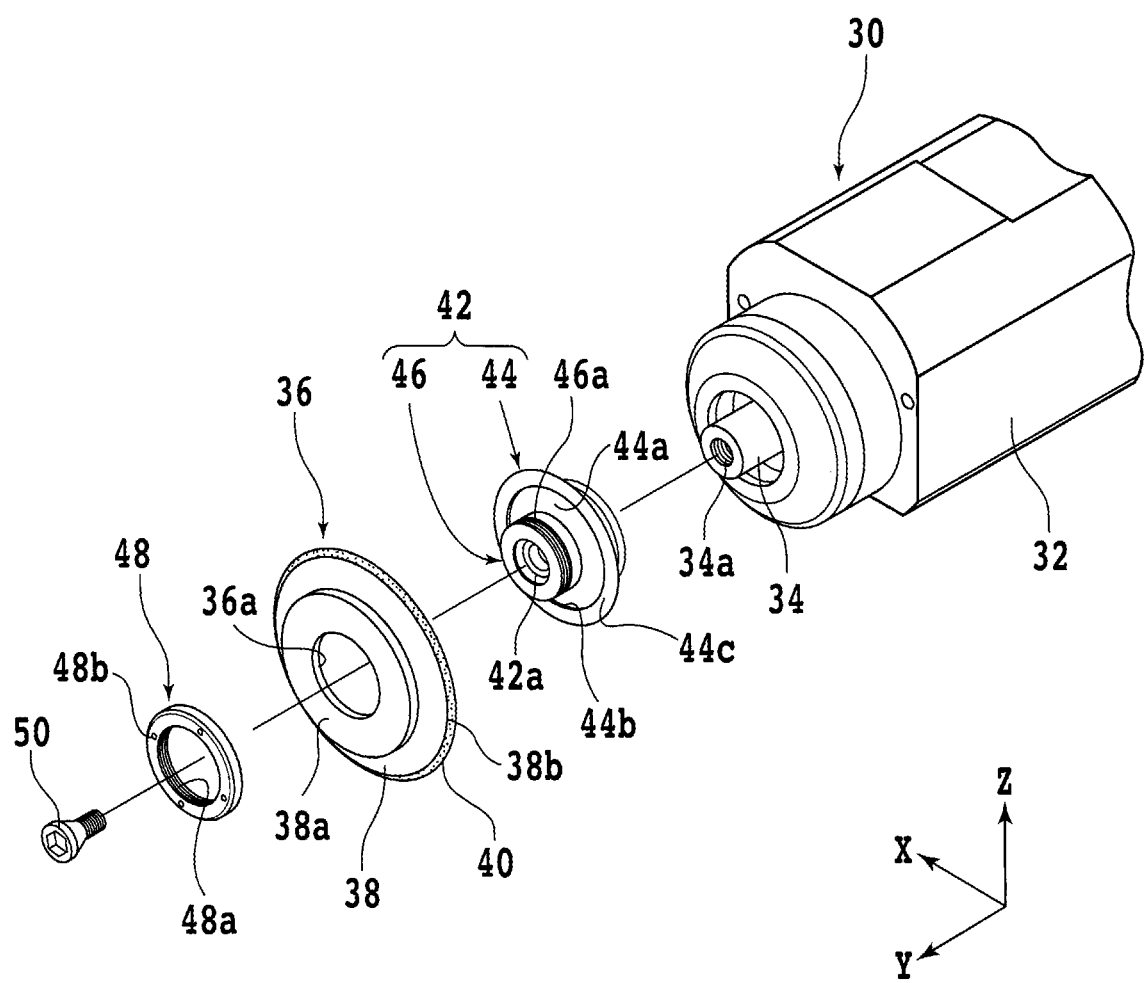
FIG. 2 is an exploded perspective view of a cutting unit of the cutting apparatus, with a hub-type cutting blade mounted thereon.

FIG. 2 illustrates in exploded perspective one of the cutting units 30 each with the hub-type cutting blade 36 mounted thereon. The cutting units 30 are identical in structure to each other, and hence one of them will be described hereinbelow. The cutting unit 30 includes a tubular housing 32 and a cylindrical spindle 34 rotatably housed as a rotational shaft in the housing 32 and extending along the Y-axis directions.

The spindle 34 has a distal end portion, i.e., one end portion, exposed out of the housing 32. The distal end portion of the spindle 34 has an axial, internally threaded hole 34a defined therein that is open at an end face thereof. The spindle 34 has a proximal end portion, i.e., another end portion, connected to a rotary actuator such as an electric motor. The hub-type cutting blade 36, which is of an annular shape, is mounted on the exposed distal end portion of the spindle 34. The cutting blade 36 mounted on the distal end portion of the spindle 34 is rotatable about its own central axis by the rotational power transmitted from the rotary actuator through the spindle 34.

The cutting blade 36 includes an annular base 38 made of metal or the like and an annular cutting edge 40 disposed on and extending along an outer circumferential edge portion of the base 38. The cutting blade 36 has a circular opening 36a that is defined centrally therein, i.e., in the base 38 and that extends thicknesswise therethrough, i.e., through the base 38.

The base 38 has a face side, i.e., a first surface, 38a and a reverse side, i.e., a second surface, 38b that lie generally parallel to each other. The face side 38a of the base 38 provides an annular holdable surface that is to be held when the cutting blade 36 is mounted and dismounted. The cutting edge 40 is formed on an outer circumferential edge portion of the reverse side 38b of the base 38. For example, the cutting edge 40 is made of an electroformed grindstone including abrasive grains of diamond or the like that are secured together by a binder such as a nickel plating layer.

A mount flange 42 on which the cutting blade 36 is to be mounted is fixed to the distal end portion of the spindle 34. The mount flange 42 includes a disk-shaped flange member 44 supporting the cutting blade 36 thereon and a cylindrical boss, i.e., a support shaft, 46 protruding centrally from a surface 44a of the flange member 44 that faces the cutting blade 36. The mount flange 42 has a through hole 42a defined therein that extends axially through a central portion of the flange member 44 and a central portion of the boss 46.

The flange member 44 includes an annular land 44b extending on an outer circumferential edge portion thereof and protruding axially from the surface 44a. The land 44b has a distal end face lying generally parallel to the surface 44a and providing an annular support surface 44c that supports the cutting blade 36 thereon.

The boss 46 has a distal end portion having an externally threaded outer circumferential surface 46a having threads and grooves. An annular nut 48 is to be threaded over the externally threaded outer circumferential surface 46a of the boss 46. The nut 48 has a circular opening 48a that is defined centrally therein and that extends thicknesswise through the nut 48. The opening 48a is essentially equal in diameter to the boss 46 and defined by an internally threaded inner circumferential surface having threads and grooves that are complementary to those of the externally threaded outer circumferential surface 46a of the boss 46. The nut 48 also has a plurality of through holes 48b defined therein that extend thicknesswise through the nut 48 and angularly spaced at substantially equal intervals circumferentially along the nut 48.

The cutting blade 36 is fixedly mounted on the mount flange 42 as follows: A screw 50 is inserted through the through hole 42a in the mount flange 42 and threaded and tightened into the internally threaded hole 34a in the spindle 34, thereby securing the mount flange 42 to the distal end portion of the spindle 34. Then, the cutting blade 36 is placed on the boss 46 of the mount flange 42 such that the boss 46 is inserted in the opening 36a in the cutting blade 36, so that the cutting blade 36 is mounted on the mount flange 42. Thereafter, the nut 48 is threaded over the externally threaded outer circumferential surface 46a of the boss 46 to sandwich the cutting blade 36 between the support surface 44c of the flange member 44 and the nut 48. The cutting blade 36 is now fixedly mounted on the mount flange 42.

Figure 3:
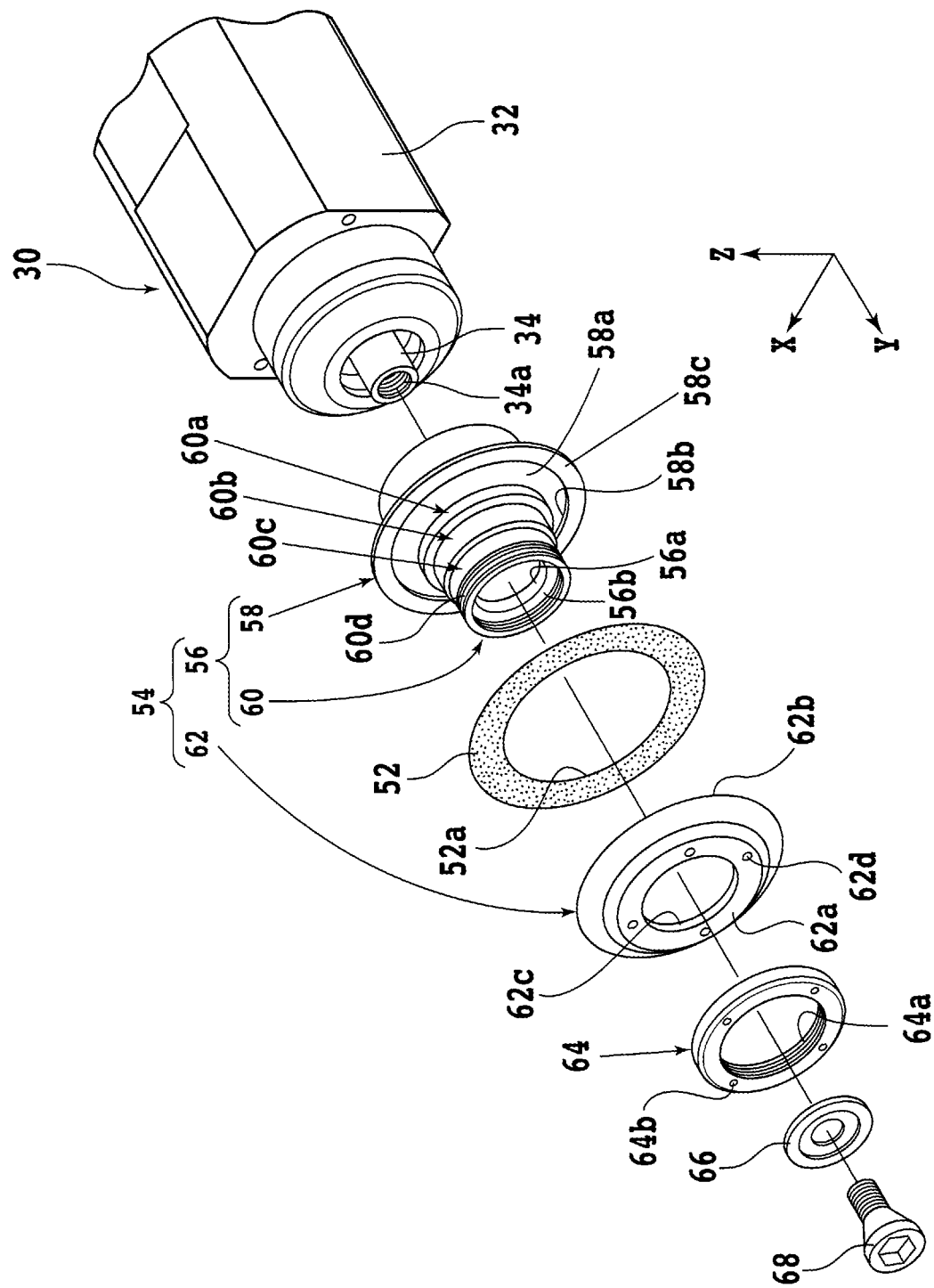
FIG. 3 is an exploded perspective view of the cutting unit with a washer-type cutting blade mounted thereon.

A washer-type cutting blade 52 (see FIG. 3) may alternatively be mounted on the cutting unit 30. FIG. 3 illustrates in exploded perspective the cutting unit 30 with the washer-type cutting blade 52 mounted thereon.

The cutting blade 52 includes an annular cutting edge made of a grindstone including abrasive grains that are secured together by a binder such as a metal bond, a resin bond, or a vitrified bond. The cutting blade 52 has a circular opening 52a that is defined centrally therein and that extends thicknesswise therethrough.

A mount flange 54 on which the cutting blade 52 is to be mounted is fixed to the distal end portion of the spindle 34. The mount flange 54 includes a fixed mount 56 to be fixed to the distal end portion of the spindle 34 and a holder flange 62 for holding the cutting blade 52 that is mounted on the fixed mount 56.

The fixed mount 56 includes a disk-shaped flange member 58 supporting the cutting blade 52 thereon and a cylindrical boss, i.e., a support shaft, 60 protruding centrally from a surface 58a of the flange member 58 that faces the cutting blade 52. The fixed mount 56 has a through hole 56a defined therein that extends axially through a central portion of the flange member 58 and a central portion of the boss 60. The fixed mount 56 also has an annular rest 56b disposed in the through hole 56a for supporting a washer 66 to be described later.

The flange member 58 includes an annular land 58b extending on an outer circumferential edge portion thereof and protruding axially from the surface 58a. The land 58b has a distal end face lying generally parallel to the surface 58a and providing an annular support surface 58c that supports the cutting blade 52 thereon.

The boss 60 includes an annular first boss member, i.e., a first support shaft, 60a protruding axially from the surface 58a of the flange member 58, an annular second boss member, i.e., a second support shaft, 60b protruding axially from the distal end of the first boss member 60a, and an annular third boss member, i.e., a third support shaft, 60c protruding axially from the distal end of the second boss member 60b. The second boss member 60b is smaller in diameter than the first boss member 60a, and the third boss member 60c is smaller in diameter than the second boss member 60b. The first boss member 60a, the second boss member 60b, and the third boss member 60c are concentric with each other.

The holder flange 62 is mounted on the fixed mount 56. The holder flange 62 is an annular component made of metal or the like and has a face side, i.e., a first surface, 62a and a reverse side, i.e., a second surface, 62b that lie generally parallel to each other. The face side 62a of the holder flange 62 provides an annular holdable surface that is to be held when the holder flange 62 is mounted and dismounted. The reverse side 62b of the holder flange 62 provides an annular holding surface for supporting the cutting blade 52.

The holder flange 62 has a circular opening 62c that is defined centrally therein and that extends axially therethrough from the face side 62a to the reverse side 62b of the holder flange 62. The holder flange 62 also has a plurality of through holes 62d that is defined in an annular region thereof between the outer circumferential edge thereof and the opening 62c and that extends axially therethrough from the face side 62a to the reverse side 62b of the holder flange 62. The through holes 62d are angularly spaced at substantially equal intervals circumferentially along the holder flange 62.

The boss 60 of the fixed mount 56 has a distal end portion having an externally threaded outer circumferential surface 60d having threads and grooves. An annular nut 64 is to be threaded over the externally threaded outer circumferential surface 60d of the boss 60. The nut 64 has a circular opening 64a that is defined centrally therein and that extends thicknesswise through the nut 64. The opening 64a is essentially equal in diameter to the third boss member 60c and defined by an internally threaded inner circumferential surface having threads and grooves that are complementary to those of the externally threaded outer circumferential surface 60d of the boss 60. The nut 64 also has a plurality of through holes 64b defined therein that extend thicknesswise through the nut 64 and angularly spaced at substantially equal intervals circumferentially along the nut 64.

The cutting blade 36 is fixedly mounted on the mount flange 54 as follows: The fixed mount 56 is mounted on the spindle 34 by a screw 68. Specifically, the washer 66 is placed axially against the rest 56b of the fixed mount 56. Then, the screw 68 is inserted through the washer 66 and the through hole 56a in the fixed mount 56 and threaded and tightened into the internally threaded hole 34a in the spindle 34, thereby securing the fixed mount 56 to the distal end portion of the spindle 34.

The cutting blade 52 and the holder flange 62 are successively placed on the boss 60 such that the boss 60 is inserted in the opening 52a in the cutting blade 52 and the opening 62c of the holder flange 62. The cutting blade 52 and the holder flange 62 are thus mounted on the fixed mount 56 successively in the order named. The reverse side 62b of the holder flange 62 has an annular ridge, not depicted, protruding axially therefrom. The annular ridge has an outer wall surface, i.e., an outer circumferential surface, that is slightly smaller in diameter than the opening 52a in the cutting blade 52, for example, and also has an inner wall surface, i.e., an inner circumferential surface, that is slightly larger in diameter than the outer circumferential surface of the first boss member 60a, for example.

The ridge of the holder flange 62 is fitted in the opening 52a in the cutting blade 52. The holder flange 62 and the cutting blade 52 are positioned with respect to each other by the ridge fitted in the opening 52a. The first boss member 60a is fitted against the inner wall surface of the ridge of the holder flange 62, and the second boss member 60b is fitted in the opening 62c in the holder flange 62.

Then, the nut 64 is threaded and tightened over the externally threaded outer circumferential surface 60d of the third boss member 60c, fixing the cutting blade 36 and the holder flange 62 to the fixed mount 56. The cutting blade 36 is thus sandwiched between the support surface 58c of the flange member 58 and the reverse side 62b of the holder flange 62 and fixedly mounted on the mount flange 54.

As described above, the hub-type cutting blade 36 or the washer-type cutting blade 52 is mounted on each of the cutting units 30 illustrated in FIG. 1. The hub-type cutting blades 36 or the washer-type cutting blades 52 mounted respectively on the cutting units 30 are disposed in facing relation to each other.

Image capturing units, i.e., reading units, 70 (see FIG. 1) for capturing images of a workpiece 11, etc. held on the chuck table 22 are mounted respectively on the cutting units 30. Each of the image capturing units 70 includes, for example, a visible-light camera including an image capturing device for generating electric signals in response to visible light applied thereto, an infrared-ray camera including an image capturing device for generating electric signals in response to infrared radiation applied thereto, or the like. The workpiece 11 on the chuck table 22 and the cutting units 30 are positioned with respect to each other on the basis of the images generated by the image capturing units 70.

As illustrated in FIG. 1, a first delivery unit 72 for delivering workpieces 11 is disposed above the base 4. The first delivery unit 72 includes an air cylinder having a rod telescopically movable vertically along the Z-axis directions. A moving mechanism, not depicted, for moving the first delivery unit 72 along the X-axis directions and the Y-axis directions is connected to an upper portion of the air cylinder. The rod of the air cylinder has a lower end fixed to a holding unit 72a for holding the frame 15 of a frame unit 17. For example, the holding unit 72a has a plurality of suction pads for holding under suction the upper surface of the frame 15 of the frame unit 17. The holding unit 72a includes, on an end thereof closer to the elevator 6, a gripping mechanism 72b for gripping an end of the frame 15 of the frame unit 17.

A second delivery unit 74 for delivering workpieces 11 is disposed above the holding unit 72a of the first delivery unit 72. The second delivery unit 74 includes an air cylinder having a rod telescopically movable vertically along the Z-axis directions. A moving mechanism, not depicted, for moving the second delivery unit 74 along the Y-axis directions is connected to an upper portion of the air cylinder.

The rod of the air cylinder has a lower end fixed to a holding unit 74a for holding the frame 15 of a frame unit 17. The holding unit 74a is structurally identical to the holding unit 72a of the first delivery unit 72 and hence will not be described in detail below.

A changer unit 76 for changing cutting blades 36, cutting blades 52, or the like on the cutting units 30 is mounted on the base 4 laterally of the chuck table 22. The structural details of the changer unit 76 will be described in detail later.

A plate-shaped cover 78 is disposed on an edge of the base 4 that faces the changer unit 76. The cover 78 has an end portion connected to the base 4 by hinges 80 and hence can be turned about the hinges 80.

When a workpiece 11 is processed by the cutting units 30, the cover 78 is erected along the Z-axis directions, i.e., is in an open state, as indicated by the solid lines in FIG. 1. On the other hand, when a cutting blade 36 or a cutting blade 52 is changed by the changer unit 76, the cover 78 lies along the X-axis directions and the Y-axis directions, i.e., is in a closed state, as indicated by the two-dot-and-dash lines in FIG. 1.

The components of the cutting apparatus 2, i.e., the elevator 6, the cleaning unit 12, the guide rails 16, the chuck table 22, the clamps 24, the sub-tables 26, the cutting units 30, the image capturing units 70, the first delivery unit 70, the second delivery unit 74, the changer unit 76, etc., are electrically connected to a control unit, i.e., a controller, 82.

The control unit 82 generates control signals for controlling operation of the components of the cutting apparatus 2.

The control unit 82 includes a computer, for example, and includes a processing unit, i.e., a blade case determining unit or a board determining unit, 82a for performing various processing operations, i.e., arithmetic operations or the like, required to operate the cutting apparatus 2, and a storage unit 82b for storing various pieces of information, i.e., data, programs, etc., used in the processing by the processing unit 82a. The processing unit 82a includes a processor such as a central processing unit (CPU). The storage unit 82b includes various memories acting as a main storage device, an auxiliary storage device, etc.

The cutting apparatus 2 constructed as described above operates to process, i.e., cut, a workpiece 11. For processing the workpiece 11, a frame unit 17 including the workpiece 11 to be processed is housed in the cassette 10. Then, the cassette 10 that houses the frame unit 17 is placed on the lifting and lowering stage 6a of the elevator 6.

The frame unit 17 housed in the cassette 10 is unloaded from the cassette 10 by the first delivery unit 72. Specifically, while the gripping mechanism 72b is gripping an end of the frame 15 of the frame unit 17, the first delivery unit 72 moves away from the cassette 10 along one of the X-axis directions. The frame unit 17 is thus pulled out of the cassette 10 and placed onto the guide rails 16. The frame unit 17 is sandwiched between the guide rails 16 and positioned in place.

Then, the first delivery unit 72 holds the upper surface of the frame 15 with the holding unit 72a, and delivers the frame unit 17 onto the chuck table 22 that is positioned in the delivery region. The chuck table 22 then moves from the delivery region to the processing region while holding the reverse side, i.e., the tape 13 side, of the workpiece 11 under suction. The workpiece 11 is now placed in the processing chamber cover 28.

After the workpiece 11 and the cutting units 30 have been positioned with respect to each other on the basis of images captured by the image capturing units 70, the workpiece 11 is cut by the cutting units 30. For example, the workpiece 11 is cut along the projected dicing lines and divided into a plurality of device chips.

When the cutting process is completed, the chuck table 22 moves to the delivery region. The second delivery unit 74 holds the upper surface of the frame 15 with the holding unit 74a and delivers the frame unit 17 from the chuck table 22 to the cleaning unit 12. The cleaning unit 12 then cleans the workpiece 11.

When the cleaning of the workpiece 11 is completed, the first delivery unit 72 holds the frame 15 with the holding unit 72a and delivers the frame unit 17 onto the guide rails 16. The frame unit 17 is sandwiched between the guide rails 16 and positioned in place. Thereafter, while the gripping mechanism 72b is gripping the frame 15, the first delivery unit 72 moves toward the cassette 10 and then places the frame unit 17 into the cassette 10.

The storage unit 82b of the control unit 82 stores programs descriptive of the above sequence of operation of the cutting apparatus 2. When an operator of the cutting apparatus 2 instructs the cutting apparatus 2 to process the workpiece 11, the processing unit 82a reads the programs from the storage unit 82b and successively generates control signals for controlling operation of the components of the cutting apparatus 2.

The cutting blades 36 or the cutting blades 52 mounted on the cutting units 30 are progressively worn as they cut workpieces 11 one after another. Therefore, the cutting blades 36 or the cutting blades 52 are replaced with cutting blades when necessary. The cutting apparatus 2 automatically changes the cutting blades 36 or the cutting blades 52 with the changer unit 76.

Figure 4:
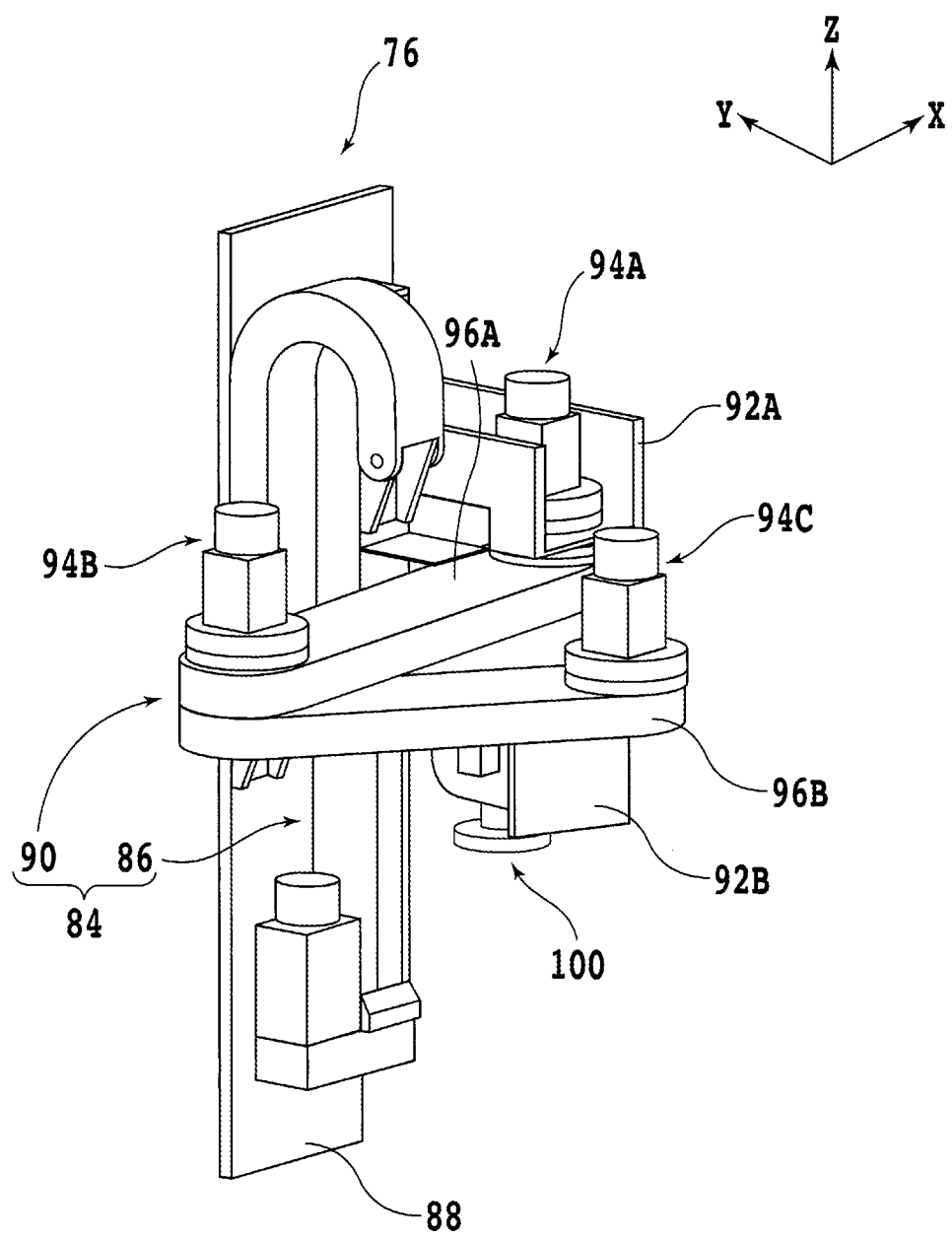
FIG. 4 is a perspective view of a changer unit of the cutting apparatus.

FIG. 4 illustrates the changer unit 76 in perspective. As illustrated in FIG. 4, the changer unit 76 includes a changing device, i.e., a changing mechanism, 100 for changing cutting blades 36 or cutting blades 52 and a moving unit, i.e., a moving mechanism, 84 for moving the changing device 100. The moving unit 84 includes a lifting and lowering mechanism 86 for moving the changing device 100 along the Z-axis directions and an articulated arm 90 coupled to the lifting and lowering mechanism 86 for moving the changing device 100 along directions, i.e., horizontal directions, parallel to the X-axis directions and the Y-axis directions.

The lifting and lowering mechanism 86 includes a columnar base plate 88 extending along the Z-axis directions. The lifting and lowering mechanism 86 moves the articulated arm 90 in the Z-axis directions along the base plate 88. The lifting and lowering mechanism 86 includes, for example, an electric motor, not depicted, that is mounted on a lower portion of the base plate 88 and that has a shaft with a drive pulley fixed thereto, and a driven pulley, not depicted, mounted on an upper portion of the base plate 88. A toothed endless belt, not depicted, is trained around the drive pulley and the driven pulley. A first support 92A of metal is secured to the toothed endless belt.

When the electric motor of the lifting and lowering mechanism 86 is energized to rotate the shaft thereof about its own central axis in a first direction, the first support 92A is lifted. On the other hand, when the electric motor of the lifting and lowering mechanism 86 is reversed to rotate the shaft thereof about its own central axis in a second direction opposite the first direction, the first support 92A is lowered. In this manner, the first support 92A is moved one or the other of the Z-axis directions.

However, the lifting and lowering mechanism 86 is not limited to any structures insofar as it can lift and lower the first support 92A. The lifting and lowering mechanism 86 may alternatively be a ball-screw-type lifting and lowering mechanism, for example. The ball-screw-type lifting and lowering mechanism has a pair of guide rails, not depicted, that are spaced from each other and that extend along the Z-axis directions, and a movable plate, not depicted, shaped as a flat plate slidably mounted on the guide rails for slidable movement therealong.

The first support 92A is fixed to a face side, i.e., a first surface, of the movable plate, and a nut, not depicted, is disposed on a reverse side, i.e., a second surface, of the movable plate. The nut is operatively threaded over a ball screw extending generally parallel to the guide rails. The ball screw has an end coupled to a stepping motor, not depicted. When the stepping motor is energized, the first support 92A is moved in one of the Z-axis directions, i.e., is lifted or lowered.

A first rotating mechanism 94A having a rotary actuator such as an electric motor is fixedly mounted on the first support 92A. The rotary actuator is oriented such that its rotational shaft extends generally parallel to the Z-axis directions. A first arm 96A that extends along directions parallel to the X-axis directions and the Y-axis directions has an end mounted on the first rotating mechanism 94A.

A second rotating mechanism 94B is mounted on the other end of the first arm 96A. The second rotating mechanism 94B has a rotary actuator such as an electric motor whose rotational shaft extends generally parallel to the Z-axis directions. A second arm 96B that extends along directions parallel to the X-axis directions and the Y-axis directions has an end mounted on the second rotating mechanism 94B.

A third rotating mechanism 94C is mounted on the other end of the second arm 96B. The third rotating mechanism 94C has a rotary actuator such as an electric motor whose rotational shaft extends generally parallel to the Z-axis directions. A second support 92B of metal is mounted on the third rotating mechanism 94C. The changing device 100 for changing cutting blades 36, cutting blades 52, etc. is mounted on the second support 92B.

Figure 5:
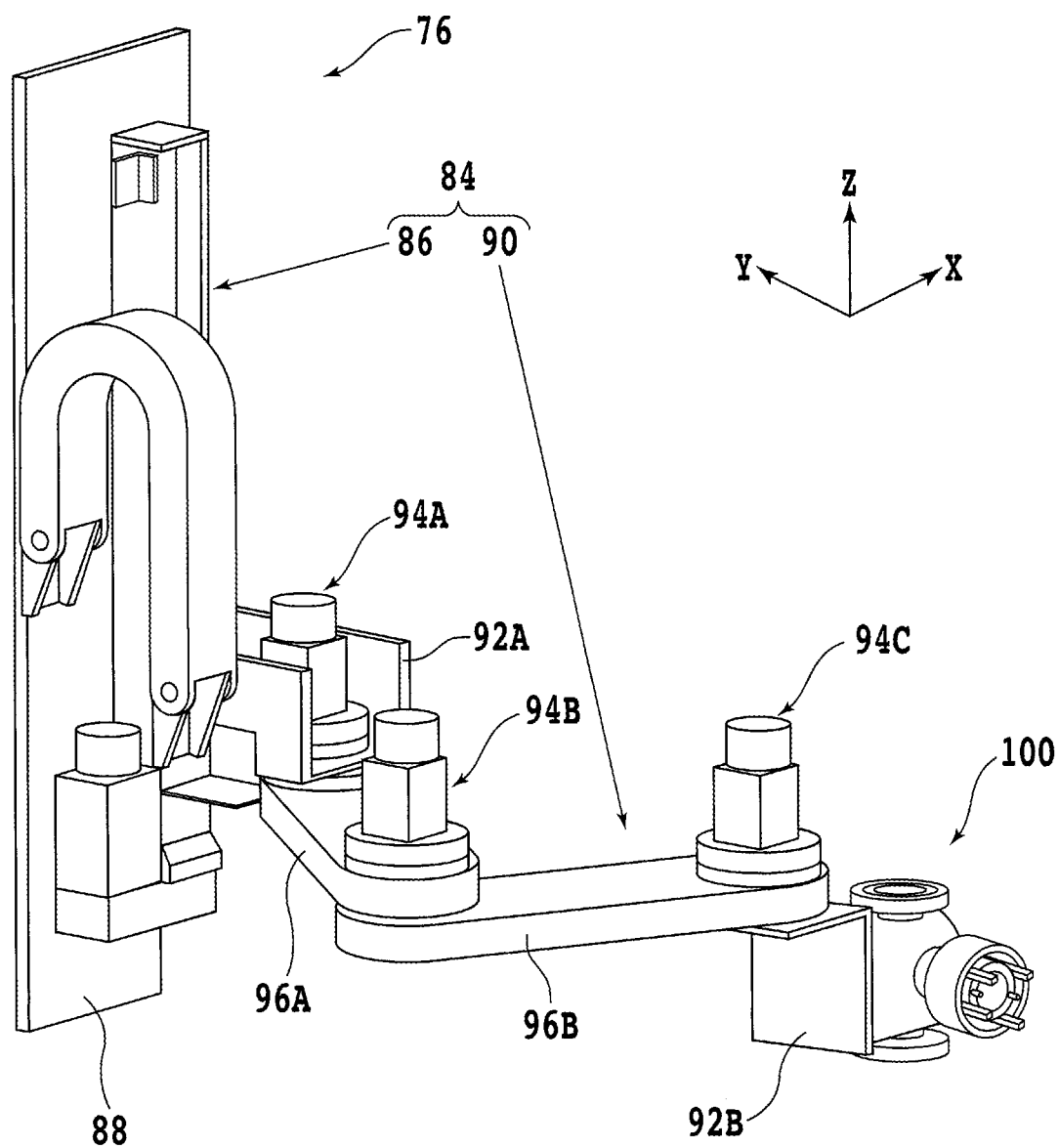
FIG. 5 is a perspective view of the changer unit with a changing device disposed in a changing position.

When the changing device 100 does not change cutting blades 36, cutting blades 52, etc., the changing device 100 is placed in a position, i.e., a retracted position, adjacent to the base plate 88, as depicted in FIG. 4. When the changing device 100 is to change cutting blades 36, cutting blades 52, etc., the moving unit 84 is actuated to place the changing device 100 in a position, i.e., a changing position, above the base 4. FIG. 5 illustrates in perspective the changer unit 76 with the changing device 100 disposed in the changing position.

The changing device 100 is movable, i.e., liftable and lowerable, along the Z-axis directions by the lifting and lowering mechanism 86, and is also movable along a plane, i.e., a horizontal plane, parallel to the X-axis directions and the Y-axis directions by the articulated arm 90. In other words, the changing device 100 can be brought to any position in a three-dimensional space by the lifting and lowering mechanism 86 and the articulated arm 90.

Figure 6:
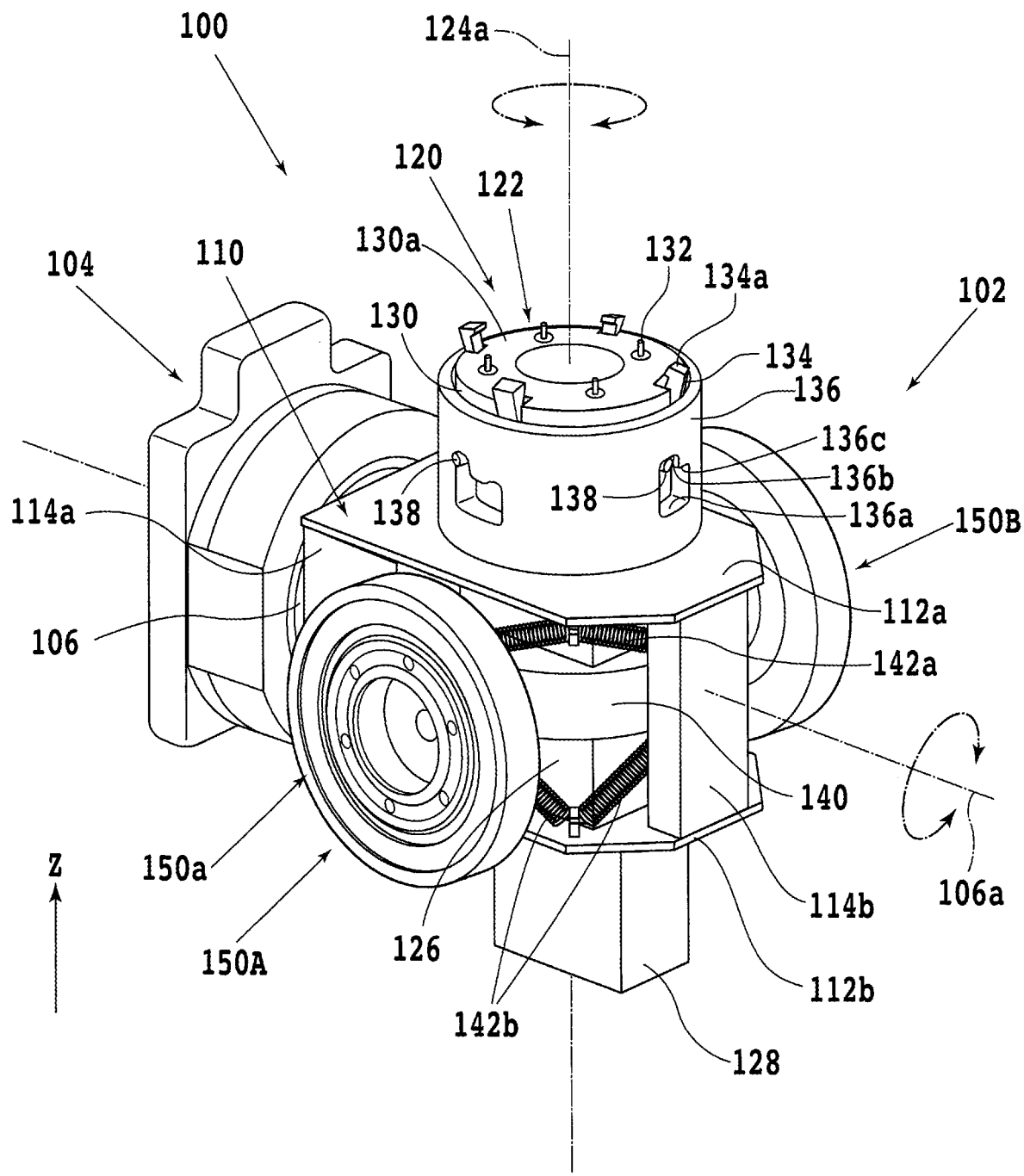
FIG. 6 is a perspective view of the changing device.
Figure 7A:
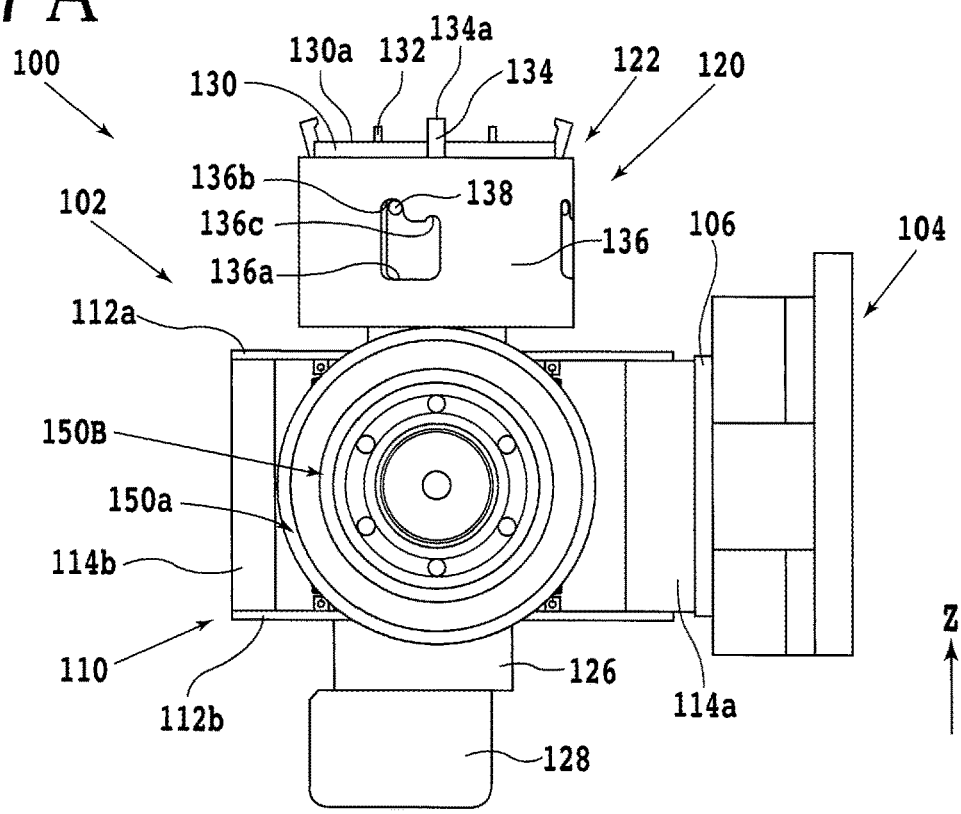
FIG. 7A is a side elevational view of the changing device.
Figure 7B:
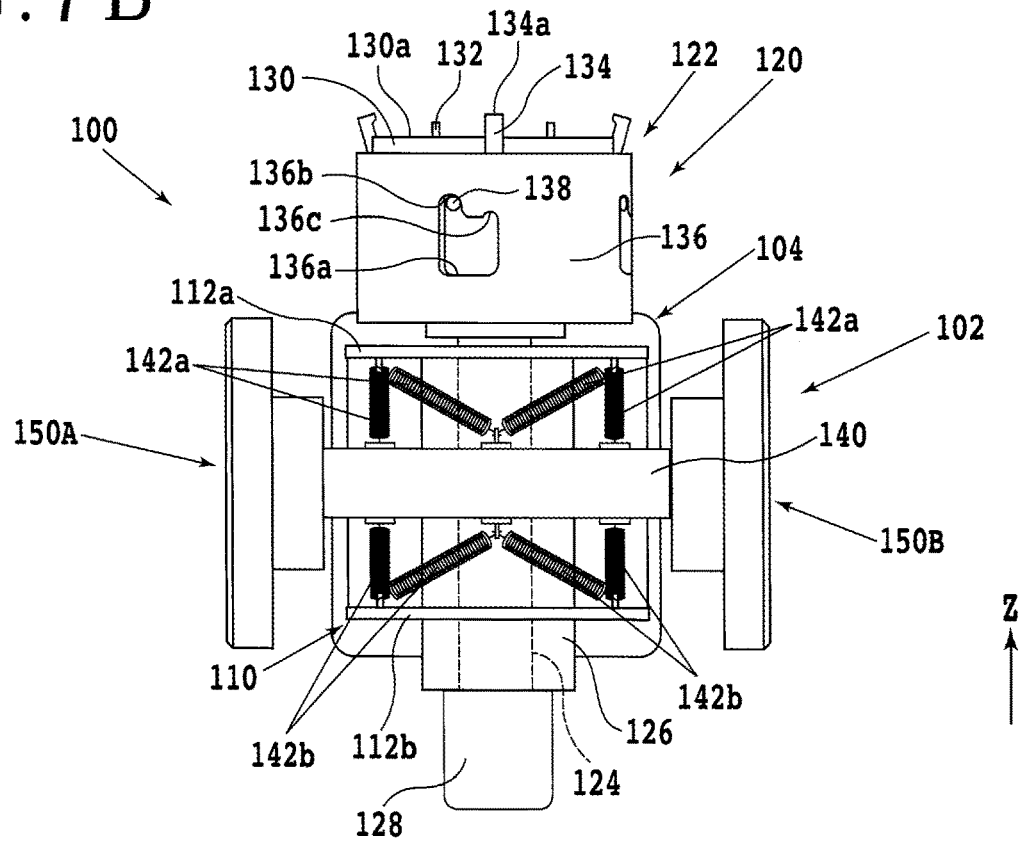
FIG. 7B is a front elevational view of the changing device.

A structural example of the changing device 100 will be described hereinbelow. FIG. 6 illustrates the changing device 100 in perspective. FIG. 7A illustrates the changing device 100 in side elevation, and FIG. 7B illustrates the changing device 100 in front elevation. In FIG. 7B, a coupling member 114a and a coupling member 114b of the components of the changing device 100 are omitted from illustration. The structural details of the changing device 100 will be described below mainly with reference to FIG. 6.

The changing device 100 includes a mounting and dismounting unit 102 for mounting and dismounting a cutting blade 36 or a cutting blade 52 and a nut 48 or a nut 64 (see FIGS. 2 and 3). A rotating mechanism 104 for rotating the mounting and dismounting unit 102 is coupled to the mounting and dismounting unit 102.

The rotating mechanism 104 includes a rotational member, i.e., a shaft, 106 coupled to the mounting and dismounting unit 102 and a rotary actuator, not depicted, such as an electric motor for rotating the rotational member 106 about its central axis, i.e., a rotational axis, 106a extending through the rotational member 106. The rotary actuator rotates the rotational member 106 bidirectionally, i.e., in a first direction and a second direction opposite the first direction, about the rotational axis 106a. When the rotational member 106 is rotated about the rotational axis 106a, the mounting and dismounting unit 102 coupled to the rotational member 106 is rotated about the rotational axis 106a in unison with the rotational member 106.

The mounting and dismounting unit 102 includes a frame 110 coupled to the rotational member 106 of the rotating mechanism 104. The frame 110 includes a pair of plate-shaped support members 112a and 112b of metal or the like that are vertically spaced from each other and extend generally parallel to each other.

A pair of coupling members 114a and 114b, each in the shape of a rectangular parallelepiped, are disposed between the support members 112a and 112b. The coupling member 114a is fixed to an end portion of the support member 112a that is closer to the rotational member 106 and an end portion of the support member 112b that is closer to the rotational member 106. The coupling member 114b is fixed to another end portion of the support member 112a that is remoter from the rotational member 106 and another end portion of the support member 112b that is remoter from the rotational member 106. The support members 112a and 112b are thus coupled to each other by the coupling members 114a and 114b.

A nut turner, i.e., a nut mounting and dismounting unit, 120 for holding and rotating a nut 48 or a nut 64 (see FIGS. 2 and 3) with which to mount a cutting blade 36 or a cutting blade 52 on the cutting unit 30 is mounted on the frame 110. The nut turner 120 includes a nut holder 122 for holding a nut 48 or a nut 64 and a columnar rotor, i.e., shaft, 124 (see FIG. 7B) coupled to the nut holder 122.

The rotor 124 is housed in a tubular housing 126. The rotor 124 has an end portion, i.e., a distal end portion, exposed out of the housing 126 and connected to the nut holder 122. The rotor 124 also has another end portion, i.e., a proximal end portion, coupled to a rotary actuator 128 such as an electric motor for rotating the rotor 124 about its central axis, i.e., a rotational axis, 124a extending through the rotor 124.

The rotary actuator 128 rotates the rotor 124 bidirectionally, i.e., in a first direction and a second direction opposite the first direction, about the rotational axis 124a. When the rotor 124 is rotated about the rotational axis 124a, the nut holder 122 that is coupled to the rotor 124 is rotated about the rotational axis 124a in unison with the rotor 124.

The support member 112a has an opening, not depicted, centrally defined therein that extends thicknesswise therethrough, and the support member 112b has an opening, not depicted, centrally defined therein that extends thicknesswise therethrough. The end portion of the rotor 124 that is exposed out of the housing 126 is inserted in the opening in the support member 112a and protrudes from the support member 112a out of the frame 110. The other end portion of the rotor 124 is inserted, together with an end of the housing 126, in the opening in the support member 112b and protrudes from the support member 112b out of the frame 110.

The end portion of the rotor 124 is coupled to the nut holder 122 outside of the frame 110. The other end portion of the rotor 124 is coupled to the rotary actuator 128 outside of the frame 110. The nut turner 120 is thus mounted on the frame 110 with the frame 110 sandwiched between the nut holder 122 and the rotary actuator 128. The nut turner 120 is disposed such that the rotational axis, corresponding to the rotational axis 124a, of the nut holder 122 extends along direction perpendicular to the rotational axis 106a of the rotational member 106.

The nut holder 122 includes a cylindrical rotational member 130 fixed to the end portion of the rotor 124. The rotational member 130 is normally biased to move away from the support member 112a by a spring or the like. When an external force is axially applied to the rotational member 130 toward the support member 112a, the rotational member 130 is axially moved toward the support member 112a against the bias of the spring or the like.

The rotational member 130 has a surface 130a positioned remotely from the support member 112a. A plurality of (four in FIG. 6) holding pins 132 project axially from the surface 130a and are angularly spaced at generally equal intervals along the circumferential directions of the surface 130a.

The holding pins 132 are positioned for alignment with the respective through holes 48b (see FIG. 2) in the nut 48 or the respective through holes 64b (see FIG. 3) in the nut 64, and can be inserted into the respective through holes 48b or the respective through holes 64b. The number, size, layout, etc. of the holding pins 132 are appropriately selected depending on the through holes 48b or the through holes 64b.

A plurality of (four in FIG. 6) gripping members 134 for gripping the nut 48 or the nut 64 are disposed around the rotational member 130 and angularly spaced at substantially equal intervals circumferentially along the rotational member 130. Each of the gripping members 134 is of a columnar shape and has a proximal end portion, i.e., an end portion, fixed to an outer circumferential surface of the rotational member 130.

Each of the gripping members 134 has a distal end portion, i.e., another end portion, protruding from the surface 130a of the rotational member 130. The distal end portion has a hook 134a bent toward the center of the rotational member 130. The gripping members 134 are normally biased by springs or the like to move radially outwardly of the rotational member 130. When an external force is applied radially inwardly to the gripping members 134, the gripping members 134 are moved radially inwardly against the bias of the springs or the like.

A hollow cylindrical cover 136 is disposed around the rotational member 130. The cover 136 is rotatable about the rotational axis 124a independently of the rotational member 130, and extends in surrounding relation to the rotational member 130 and the proximal end portions of the gripping members 134. When the surface 130a of the rotational member 130 is axially pressed into the cover 136, i.e., toward the support member 112a, the rotational member 130 and the gripping members 134 are pushed into the cover 136 while elastically deforming the spring or the like by which the rotational member 130 is normally biased.

When the rotational member 130 is pushed into the cover 136, the distal end portions of the gripping members 134 where the hooks 134a are positioned are contacted and pressed by an inner wall surface of the cover 136. At this time, the distal end portions of the gripping members 134 are moved radially inwardly with respect to the rotational member 130 while elastically deforming the springs or the like by which the gripping members 134 are normally biased. The gripping members 134 are oriented such that their longitudinal axes extend along the inner wall surface of the cover 136. The gripping members 134 are now in a closed state. At this time, the hooks 134a of the gripping members 134 are disposed radially inwardly from an outer circumferential edge of the rotational member 130, for example.

On the other hand, when the rotational member 130 is released from the axial push, the rotational member 130 is axially moved in a direction out of the cover 136 under the bias of the spring or the like, releasing the distal end portions of the gripping members 134 from the push from inner wall surface of the cover 136. Therefore, the distal end portions of the gripping members 134 are moved radially outwardly with respect to the rotational member 130 under the bias of the springs or the like. The distal end portions of the gripping members 134 are now disposed more radially outwardly with respect to the rotational member 130 than they were in the closed state. The gripping members 134 are now in an open state. At this time, the hooks 134a of the gripping members 134 are disposed radially outwardly from the outer circumferential edge of the rotational member 130, for example.

A plurality of (four, for example) pins 138 protrude from an outer circumferential surface of the rotational member 130. The cover 136 has a plurality of (four, for example) openings 136a defined therein that extend radially from an outer circumferential surface to an inner circumferential surface of the cover 136. At least portions of pins 138 are inserted respectively in the openings 136a.

The openings 136a have respective ends remote from the support member 112a that are defined by respective stepped surfaces each including a first pin receiving portion 136b and a second pin receiving portion 136c. The second pin receiving portion 136c is disposed in a position more spaced from the surface 130a of the rotational member 130, i.e., closer to the support member 112a, than the first pin receiving portion 136b.

When the nut holder 122 is in an initial state where the rotational member 130 is not pushed into the cover 136, the pins 138 are held in contact with, and hence are seated on, the first pin receiving portions 136b. When the rotational member 130 is then pushed into the cover 136, the pins 138 are spaced, i.e., unseated, from the first pin receiving portions 136b. Then, the rotor 124 is turned in the first direction about the rotational axis 124a, moving the pins 138 from the first pin receiving portion 136b side to the second pin receiving portion 136c side.

Thereafter, when the rotational member 130 is released from the push, the pins 138 are allowed to contact the respective second pin receiving portions 136c and hence to be supported by, i.e., seated on, the second pin receiving portions 136c. The rotational member 130 remains pressed in the cover 136, keeping the gripping members 134 in the closed state.

On the other hand, when the rotational member 130 pressed in the cover 136 is further pushed into the cover 136, the pins 138 are unseated from the second pin receiving portions 136c. Then, when the rotor 124 is turned in the second direction that is opposite the first direction, the pins 138 are moved from the second pin receiving portion 136c side to the first pin receiving portion 136b side.

Thereafter, when the rotational member 130 is released from the push, the pins 138 are allowed to contact the respective first pin receiving portions 136b and hence to be supported by, i.e., seated on, the first pin receiving portions 136b. The rotational member 130 are pushed in a direction out of the cover 136, bringing the gripping members 134 into the open state.

The nut turner 120 turns while holding the nut 48 or the nut 64. Specifically, the surface 130a of the rotational member 130 contacts the nut 48 or the nut 64 such that the holding pins 132 are inserted into the respective through holes 48b (see FIG. 2) in the nut 48 or the respective through holes 64b (see FIG. 3) in the nut 64. Then, when the rotational member 130 is pushed into the cover 136, the gripping members 134 are brought into the closed state, causing the hooks 134a to contact the outer circumferential surface of the nut 48 or the nut 64 to thereby grip the nut 48 or the nut 64.

When the rotary actuator 128 rotates the rotor 124 (see FIG. 7B) while the nut 48 or the nut 64 is being gripped by the gripping members 134, the rotational member 130 coupled to the rotor 124 is rotated, rotating the nut 48 or the nut 64 held by the gripping members 134.

Since the nut turner 120 holds and rotates the nut 48 or the nut 74, the nut 48 or the nut 64 can automatically be loosened and detached or tightened and attached at the time the cutting blade 36 or the cutting blade 52 mounted on the cutting unit 30 is changed.

For example, for removing the nut 48 (see FIG. 2) mounted on the mount flange 42 of the cutting unit 30, the lifting and lowering mechanism 86 and the articulated arm 90 (see FIGS. 4 and 5) move the changing device 100 and place the changing device 100 into the processing chamber cover 28 through the inlet/outlet port 28a (see FIG. 1) defined therein. The rotating mechanism 104 then turns the mounting and dismounting unit 102 to cause the nut holder 122 to face the mount flange 42.

Thereafter, the nut holder 122 is moved toward the mount flange 42 until the surface 130a of the rotational member 130 is pressed against the nut 48 mounted on the mount flange 42. At this time, the holding pins 132 of the rotational member 130 are inserted into the respective through holes 48b in the nut 48.

The rotational member 130 is pressed into the cover 136 by the nut 48, bringing the gripping members 134 into the closed state. The nut 48 is now gripped by the hooks 134a of the gripping members 134.

Then, the rotary actuator 128 rotates the rotor 124 (see FIG. 7B) to rotate the rotational member 130 in the first direction around the rotational axis 124a, i.e., a direction to loosen the nut 48. The nut 48 gripped by the rotational member 130 is rotated and detached from the boss 46 of the mount flange 42. When the rotational member 130 that has been pushed into the cover 136 is rotated in the first direction, the pins 138 are moved from the first pin receiving portion 136b side to the second pin receiving portion 136c side.

Thereafter, the nut holder 122 is moved away from the mount flange 42. At this time, the pins 138 are supported by the second pin receiving portions 136c, keeping the rotational member 130 pushed in the cover 136. The gripping members 134 thus remain in the closed state, continuously gripping the nut 48.

On the other hand, for mounting the nut 48 on the mount flange 42, the nut holder 122 that is holding the nut 48 is brought into facing relation to the mount flange 42 and moved toward the mount flange 42. The nut 48 held by the nut holder 122 is positioned at the distal end of the boss 46 of the mount flange 42, and then pushes the rotational member 130 into the cover 136 upon continued movement of the nut holder 122.

Then, the rotary actuator 128 rotates the rotor 124 (see FIG. 7B), rotating the rotational member 130 in the second direction opposite the first direction around the rotational axis 124a, i.e., a direction to tighten the nut 48. The nut 48 is rotated and threaded and tightened over the externally threaded outer circumferential surface 46a of the boss 46 of the mount flange 42, and mounted on the mount flange 42. When the rotational member 130 that has been pushed into the cover 136 is rotated in the second direction, the pins 138 are moved from the second pin receiving portion 136c side to the first pin receiving portion 136b side.

Thereafter, the nut holder 122 is moved away from the mount flange 42. The rotational member 130 is pushed in a direction out of the cover 136, releasing the nut 48 from the gripping members 134. The pins 138 are supported by the first pin receiving portions 136b.

The gripping members 134 may be brought selectively into the closed state and the open state by any of various mechanisms other than those described above that include the pins 138 and the openings 136a. For example, instead of the pins 138 on the rotational member 130, an actuator for moving the cover 136 heightwise of the cover 136 in directions parallel to the rotational axis 124a may be incorporated in the mounting and dismounting unit 102. The actuator may include an air cylinder or the like and may be fixed to the support member 112a. The actuator moves the cover 136 to bring the gripping members 134 selectively into the closed state and the open state.

An annular member 140 made of metal or the like is disposed between the support members 112a and 112b. The annular member 140 that lies generally parallel to the support members 112a and 112b surrounds the housing 126, i.e., the rotor 124, and stays out of contact with the housing 126.

The annular member 140 is coupled to the support member 112a by a plurality of resilient bodies, i.e., resilient members, 142a and is also coupled to the support member 112b by a plurality of resilient bodies, i.e., resilient members, 142b. The annular member 140 is suspended by the resilient members 142a and 142b and held out of contact with the support members 112a and 112b (see FIG. 7B).

For example, each of the resilient members 142a and 142b is a resiliently contractible and extensible member such as a spring or a rubber band. When an external force is applied to the annular member 140, the annular member 140 is moved or turned in a direction depending on the applied external force while being resiliently supported by the resilient members 142a and 142b as they are contracted and extended.

A holder 150A, i.e., a first holder, and a holder 150B, i.e., a second holder, for holding the cutting blade 36 or the cutting blade 52 are coupled to respective outer circumferential surfaces of the annular member 140. Each of the holders 150A and 150B is a disk-shaped member made of resin, metal, or like, and has a circular surface 150a facing away from the annular member 140 for holding the cutting blade 36 or the cutting blade 52 thereon. The holders 150A and 150B are disposed in respective positions opposite each other across the frame 110 such that the surfaces 150a of the holders 150A and 150B face outwardly away from the frame 110.

The holders 150A and 150B are angularly spaced 90° from the nut holder 122 in the circumferential directions of the rotational member 106 of the rotating mechanism 104, i.e., in the rotational directions along which the rotational member 106 rotates. The nut holder 122, the surface 150a of the holder 150A, and the surface 150a of the holder 150B are angularly spaced from each other around the rotational axis 106a, and face outwardly away from the rotational axis 106a.

Figure 8A:
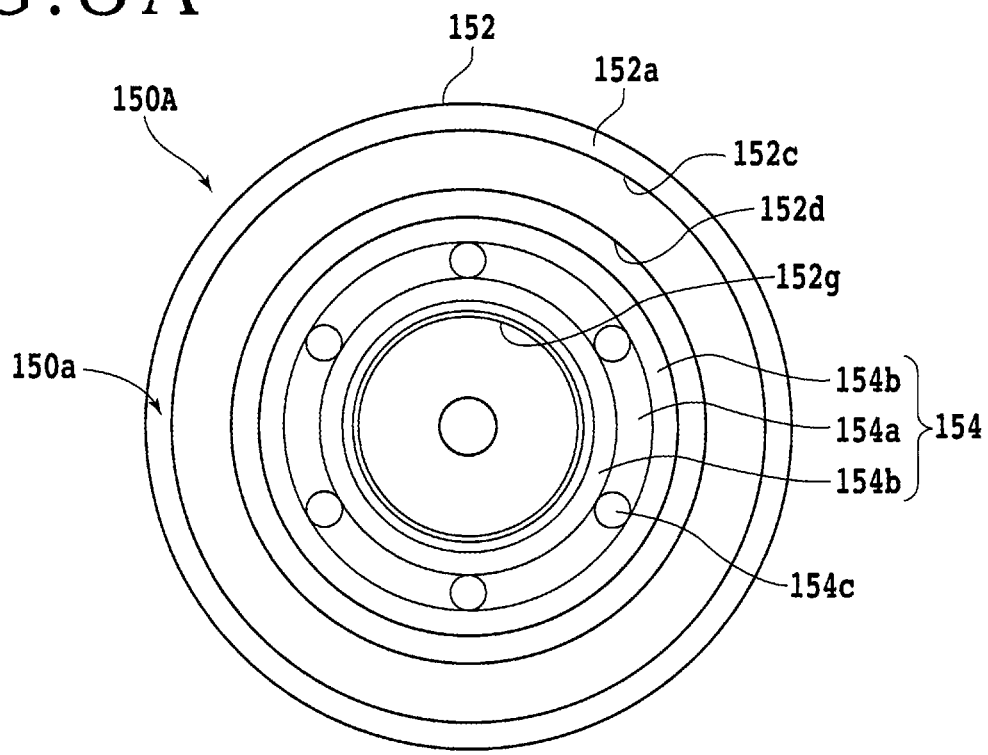
FIG. 8A is a front elevational view of a holder of the changing device.
Figure 8B:
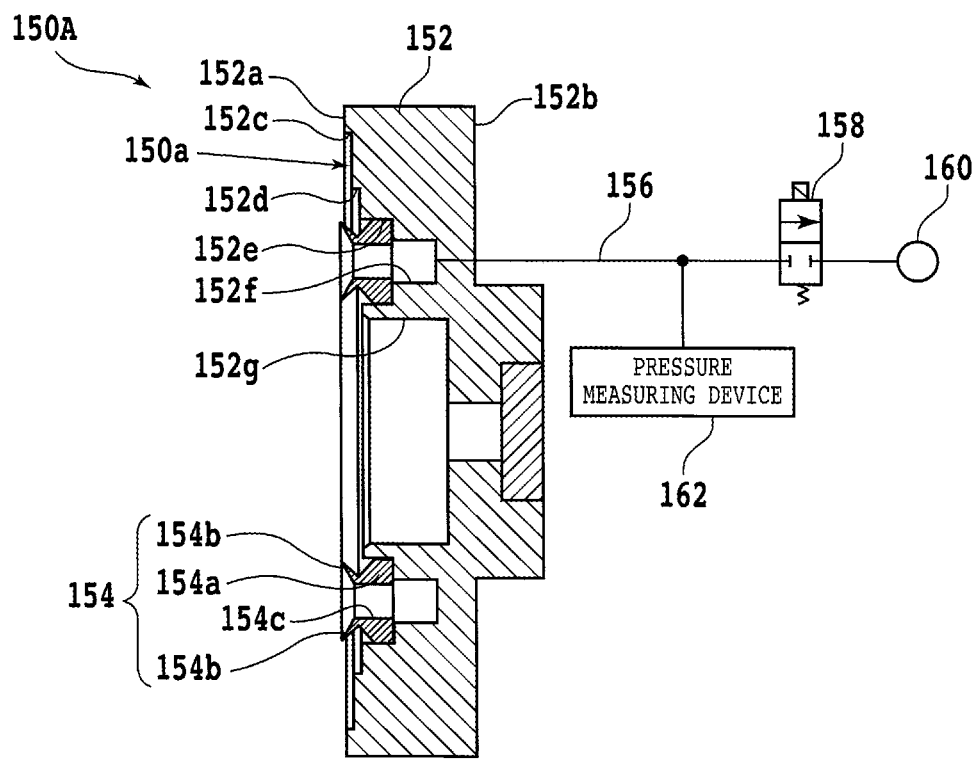
FIG. 8B is a cross-sectional view of the holder.

A structural example of the holders 150A and 150B will be described below. FIG. 8A illustrates the holder 150A in plan and FIG. 8B illustrates the holder 150A in cross section. Although the structural and functional details of the holder 150A will be described below, the structural and functional details of the holder 150B are identical to those of the holder 150A and hence will not be described below.

The holder 150A includes a disk-shaped frame 152 made of resin, metal, or the like. The frame 152 includes a face side, i.e., a first surface, 152a, and a reverse side, i.e., a second surface, 152b that lie generally parallel to each other. The face side 152a of the frame 152 acts as the surface 150a of the holder 150A. The face side 152a of the frame 152 has a circular first groove, i.e., a first recess, 152c defined centrally therein. The first groove 152c is larger in diameter than the face side 38a (see FIG. 9A) of the base 38 of the cutting blade 36 and the face side 62a (see FIG. 9B) of the holder flange 62.

Moreover, the bottom of the first groove 152c has a circular second groove, i.e., a second recess, 152d defined centrally therein. The bottom of the second groove 152d has an annular third groove, i.e., a third recess, 152e that is defined therein and that has a predetermined width along the outer circumferential edge of the second groove 152d.

An annular elastic member 154 is fitted in the third groove 152e. The elastic member 154 is made of an elastic material that is elastically deformable, such as rubber or resin. The elastic member 154 includes an annular base 154a fitted in the third groove 152e and a pair of lips 154b protruding from the base 154a. One of the lips 154b extends continuously along a radially outer portion of the annular base 154a, whereas the other lip 154b extends continuously along a radially inner portion of the annular base 154a.

The lips 154b are progressively spaced away from each other in a direction toward their tip ends away from the base 154a. Specifically, the lips 154b that protrudes from the base 154a fitted in the third groove 152e are inclined to the face side 152a of the frame 152.

The lips 154b spread from the inside toward outside of the base 154a in the radial directions of the base 154a. Specifically, the lips 154b are oriented from the inside toward outside of the base 154a in the widthwise directions of the third groove 152e. The tip ends of the lips 154b protrude from the face side 152a of the frame 152 in the widthwise directions of the frame 152.

The base 154a has a plurality of through holes 154c defined therethrough in a region thereof that overlaps the space between the lips 154b. For example, as illustrated in FIG. 8A, the base 154a has six through holes 154c spaced at generally equal intervals along the circumferential directions of the elastic member 154. The through holes 154c have ends that are open at the face side 152a of the frame 152 and other ends joined to an annular fourth groove, i.e., a fourth recess, 152f defined in the bottom of the third groove 152e.

The fourth groove 152f is connected to an end of a fluid channel 156 that includes a tube, a pipe, or the like. The other end of the fluid channel 156 is connected through a valve 158 to a suction source 160. The valve 158 includes, for example, a solenoid-operated valve that is selectively openable and closable by an electric signal applied to its solenoid. The suction source 160 includes an ejector or the like. When the valve 158 is opened, a negative pneumatic pressure generated by the suction source 160 is transmitted through the fluid channel 156, the fourth groove 152f in the frame 152, and the through hole 154c in the elastic member 154 and acts in the space between the lips 154b.

A pressure measuring device, i.e., a pressure sensor, 162 for measuring the pneumatic pressure in the fluid channel 156 is connected to the fluid channel 156 at a position between the fourth groove 152f and the valve 158. For example, the pressure measuring device 162 measures the pneumatic pressure in the fluid channel 156 based on the gage pressure, i.e., the difference between the absolute pressure and the atmospheric pressure. The value of the pneumatic pressure in the fluid channel 156 that is measured by the pressure measuring device 162 is output to the control unit 82 (see FIG. 1) where the measured value of the pneumatic pressure is stored in the storage unit 82b.

The cutting blade 36 or the cutting blade 52 is held by the holder 150A described above. For changing the cutting blade 36 or the cutting blade 52, the cutting blade 36 or the cutting blade 52 that is mounted on the cutting unit 30, e.g., a used cutting blade, and a cutting blade 36 or a cutting blade 52 as a replacement cutting blade, e.g., an unused cutting blade, are held by the holder 150A. The holder 150A is capable of holding either hub-type cutting blades 36 or washer-type cutting blades 52.

Figure 9A:
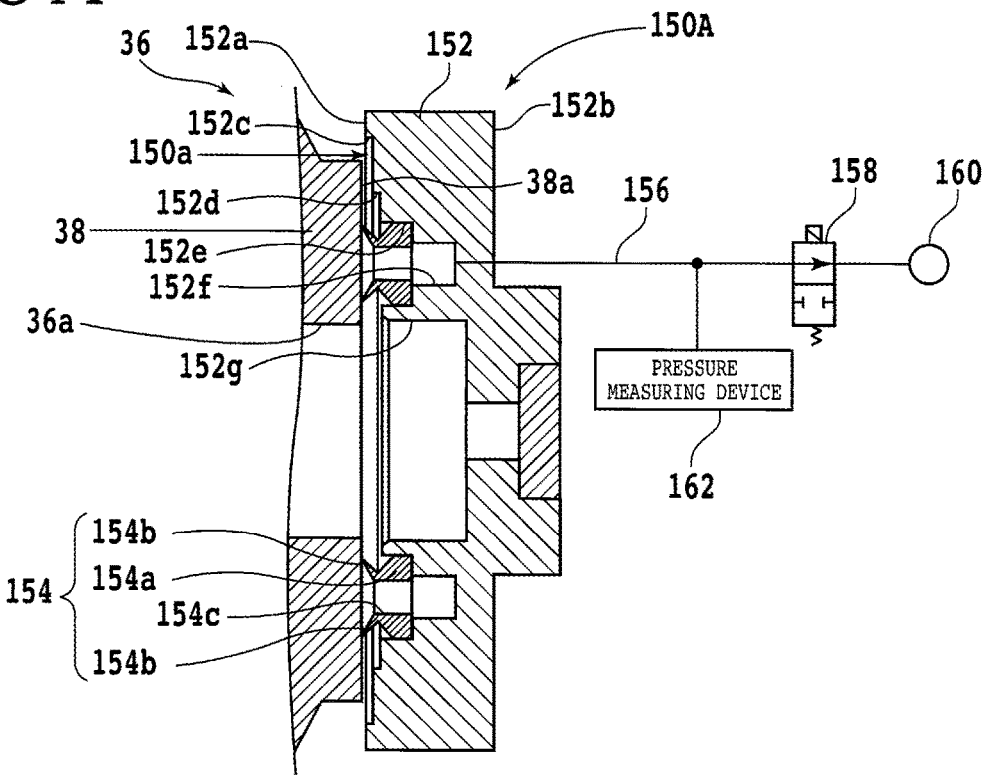
FIG. 9A is a cross-sectional view of the holder as it is holding a hub-type cutting blade.

FIG. 9A illustrates in cross section the holder 150A as it is holding a hub-type cutting blade 36. When the holder 150A is to hold the cutting blade 36, the valve 158 is opened to allow the negative pneumatic pressure from the suction source 160 to act in the space between the lips 154b. Then, while the surface 150a of the holder 150A is facing the cutting blade 36, the holder 150A is moved closely to the base 38 of the cutting blade 36.

Upon contact of the face side 38a of the base 38 with the tip ends of the lips 154b, the space between the lips 154b is closed and starts being evacuated by the negative pneumatic pressure from the suction source 160. The lips 154b are elastically deformed and brought into intimate contact with the cutting blade 36, which is now held under suction by the holder 150A.

Figure 9B:
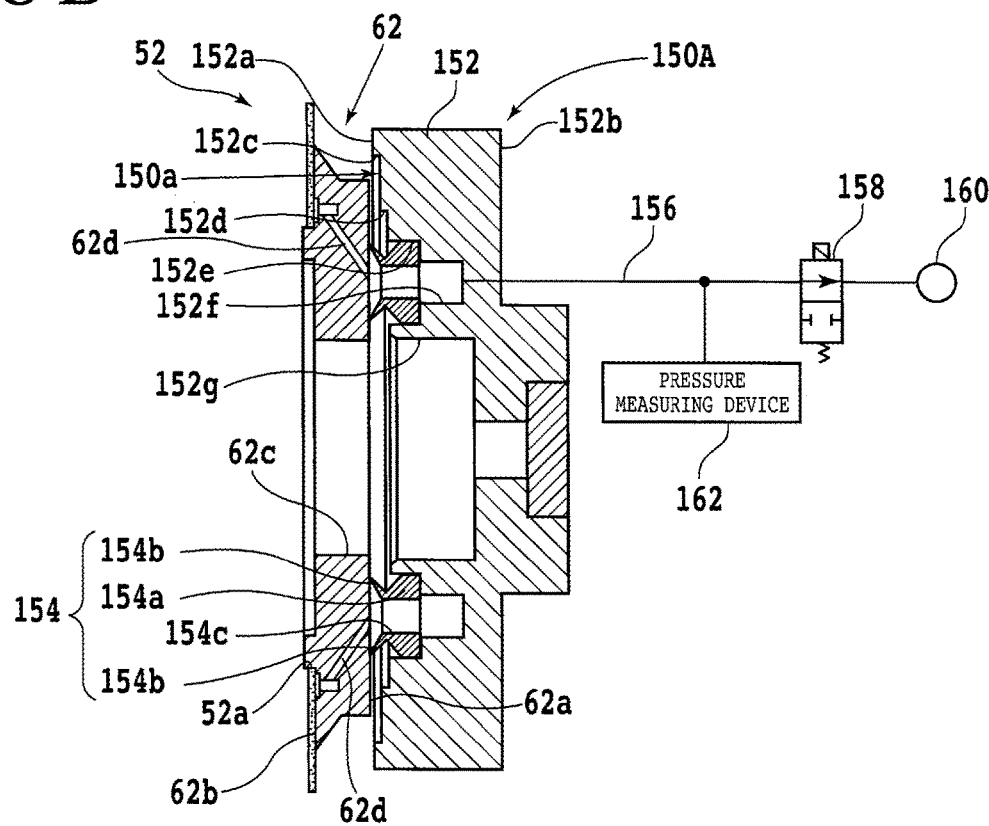
FIG. 9B is a cross-sectional view of the holder as it is holding a washer-type cutting blade.

FIG. 9B illustrates in cross section the holder 150A as it is holding a washer-type cutting blade 52. When the holder 150A is to hold the cutting blade 52, the holder 150A attracts the face side 62a of the holder flange 62 under suction and also attracts the cutting blade 52 under suction through the through holes 62d in the holder flange 62.

Specifically, for example, the valve 158 is opened to allow the negative pneumatic pressure from the suction source 160 to act in the space between the lips 154b. Then, while the surface 150a of the holder 150A is facing the holder flange 62 and the cutting blade 52, the holder 150A is moved closely to the holder flange 62.

Upon contact of the face side 62a of the holder flange 62 with the tip ends of the lips 154b, the space between the lips 154b is closed and starts being evacuated by the negative pneumatic pressure from the suction source 160. The lips 154b are elastically deformed and brought into intimate contact with the holder flange 62, which is now held under suction by the holder 150A.

The negative pneumatic pressure from the suction source 160 also acts through the through holes 62d in the holder flange 62 on the cutting blade 52. Therefore, the cutting blade 52 is held under suction by the holder 150A through the holder flange 62.

The through holes 62d are open in an area of the face side 62a of the holder flange 62 that corresponds to the elastic member 154 and in an area of the reverse side 62b of the holder flange 62 that is held in contact with the cutting blade 52. Each of the through holes 62d has a diameter of approximately 1 mm, for example.

The holder 150A may hold only the holder flange 62. Specifically, the holder 150A attracts under suction the holder flange 62 that is not held in contact with the cutting blade 52. At this time, though the negative pneumatic pressure from the suction source 160 slightly leaks through the through holes 62d in the holder flange 62, the negative pneumatic pressure, i.e., the suction force, from the suction source 160 can adequately be controlled to enable the holder 150A to hold the holder flange 62.

The holder 150A holds the cutting blade 36 or the cutting blade 52 in the manner described above. It is possible to ascertain whether the holder 150A is properly holding a desired object or not by measuring the pneumatic pressure in the fluid channel 156 with the pressure measuring device 162.

For example, when the holder 150A holds the cutting blade 36 (see FIG. 9A), the space between the lips 154b is closed. The pneumatic pressure, denoted by Pa1, developed in the fluid channel 156 when the holder 150A is holding the cutting blade 36 and the pressure, denoted by $P_{a2}$, developed in the fluid channel 156 when the holder 150A is not holding the cutting blade 36 are different from each other ($P_{a2}>P_{a1}$).

Therefore, it is possible to ascertain whether the holder 150A is holding the cutting blade 36 or not by comparing the pneumatic pressure measured by the pressure measuring device 162 with a preset threshold value $P_{tha}$ ($P_{a1}<P_{tha}<P_{a2}$).

When the holder 150A holds the cutting blade (see FIG. 9B), the pneumatic pressure, denoted by $P_{b1}$, developed in the fluid channel 156 when the holder 150A is holding the cutting blade 52 and the holder flange 62, the pneumatic pressure, denoted by $P_{b2}$, developed in the fluid channel 156 when the holder 150A is holding only the holder flange 62, and the pneumatic pressure, denoted by $P_{b3}$, developed in the fluid channel 156 when the holder 150A is holding neither the cutting blade 52 nor the holder flange 62, are different from each other ($P_{b3}>P_{b2}>P_{b1}$).

Consequently, it is possible to ascertain whether the holder 150A is holding the cutting blade 52 and the holder flange 62 or not by comparing the pneumatic pressure measured by the pressure measuring device 162 with a preset threshold value $P_{thb1}$ ($P_{b1}<P_{thb1}<P_{b2}$) and a preset threshold value $P_{thb2}$ ($P_{b2}<P_{thb2}<P_{b3}$).

The above ascertaining processes can be performed by storing the threshold values $P_{tha}$, $P_{thb1}$, and $P_{thb2}$ in the storage unit 82b (see FIG. 1) of the control unit 82 and having the processing unit 82a perform a processing sequence for comparing the pneumatic pressure measured by the pressure measuring device 162 with the threshold values. For example, the storage unit 82b stores a program descriptive of the processing sequence for comparing the measured pneumatic pressure with the threshold values. The processing unit 82a accesses the storage unit 82b, reads the program from the storage unit 82b, and executes the read program to compare the measured pneumatic pressure with the threshold values.

As described above, the holder 150A holds the cutting blade 36 or the cutting blade 52. The holder 150B also holds the cutting blade 36 or the cutting blade 52 in the same manner as the holder 150A.

A cylindrical fifth groove, i.e., a fifth recess, 152g is defined in the face side 152a of the frame 152 radially inwardly of the fourth groove 152f. The fifth groove 152g is larger in diameter than the boss 46 (see FIG. 2) of the mount flange 42 and the third boss member 60c (see FIG. 3) of the mount flange 54. When the holder 150A or the holder 150B is moved closely to the cutting unit 30, the distal end of the boss 46 or the third boss member 60c is inserted into the fifth groove 152g, avoiding contact between the holder 150A or the holder 150B and the cutting unit 30.

The holder 150A or the holder 150B may not necessarily have the elastic member 154, but may have two concentric O-rings having different diameters instead of the elastic member 154. One of the O-rings may be disposed on and extend along a side wall of the third groove 152e that is located in a radially outer position with respect to the frame 152 and the other O-ring may be disposed on and extend along a side wall of the third groove 152e that is located in a radially inner position with respect to the frame 152.

As illustrated in FIGS. 6 and 7B, the holder 150A and the holder 150B are coupled to the rotational member 106 of the rotating mechanism 104 through the resilient members 142a and the resilient members 142b. Therefore, the holder 150A and the holder 150B can be tilted through respective certain angles. In other words, when an external force is applied to the holder 150A or the holder 150B, the surface 150a thereof is tilted in a certain direction.

When the cutting blade 36 or the holder flange 62 is brought into contact with the surface 150a of the holder 150A or the surface 150a of the holder 150B, the holder 150A or the holder 150B is tilted to have the surface 150a thereof lie parallel to the face side 38a of the cutting blade 36 or the face side 62a of the holder flange 62. Therefore, the surface 150a of the holder 150A or the surface 150a of the holder 150B appropriately contacts the cutting blade 36 or the holder flange 62, allowing the cutting blade 36 or the holder flange 62 to be reliably held under suction on the surface 150a of the holder 150A or the surface 150a of the holder 150B.

The changing device 100 described above changes the cutting blade 36 or the cutting blade 52. For changing the cutting blade 36 or the cutting blade 52, the cutting blade 36 or the cutting blade 52 mounted on the cutting unit 30 is detached, and then a replacement cutting blade 36 or a replacement cutting blade 52 is mounted on the cutting unit 30. Replacement cutting blades 36 and replacement cutting blades 52 have been stored in the cutting apparatus 2 in advance.

Figure 10A:
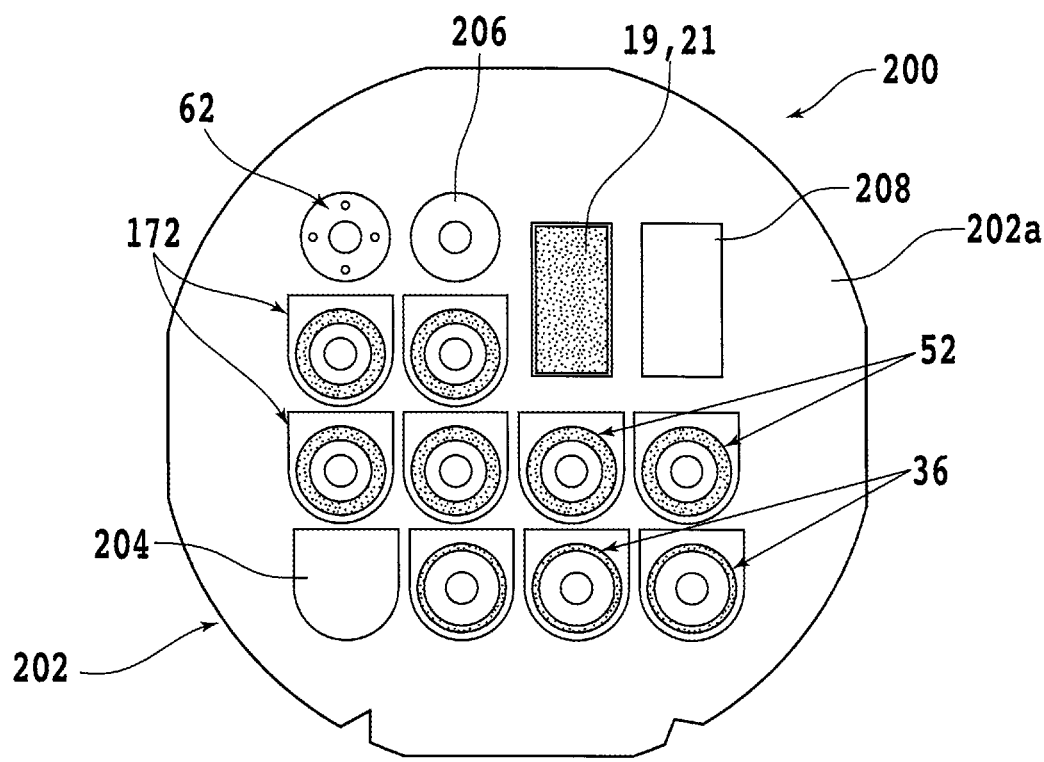
FIG. 10A is a plan view of a support unit in which replacement cutting blades are supported and stored.

FIG. 10A illustrates in plan a support unit, i.e., a stocker, 200 where replacement cutting blades 36 and replacement cutting blades 52 are supported and stored. As illustrated in FIG. 10A, the support unit 200 includes a support plate 202 having the same outline as a frame 15 that supports a workpiece 11, for example.

The support plate 202 has an upper surface 202a having a plurality of blade case supports 204 constructed to support respective blade cases 172 that house cutting blades 36 or cutting blades 52. The blade cases 172 are structurally identical to each other. For example, each of the blade case supports 204 includes a recessed region shaped complementarily to a blade case 172 and is capable of supporting a blade case 172 rested therein. Alternatively, each of the blade case supports 204 may be of a guide structure shaped complementarily to a blade case 172.

Figure 10B:
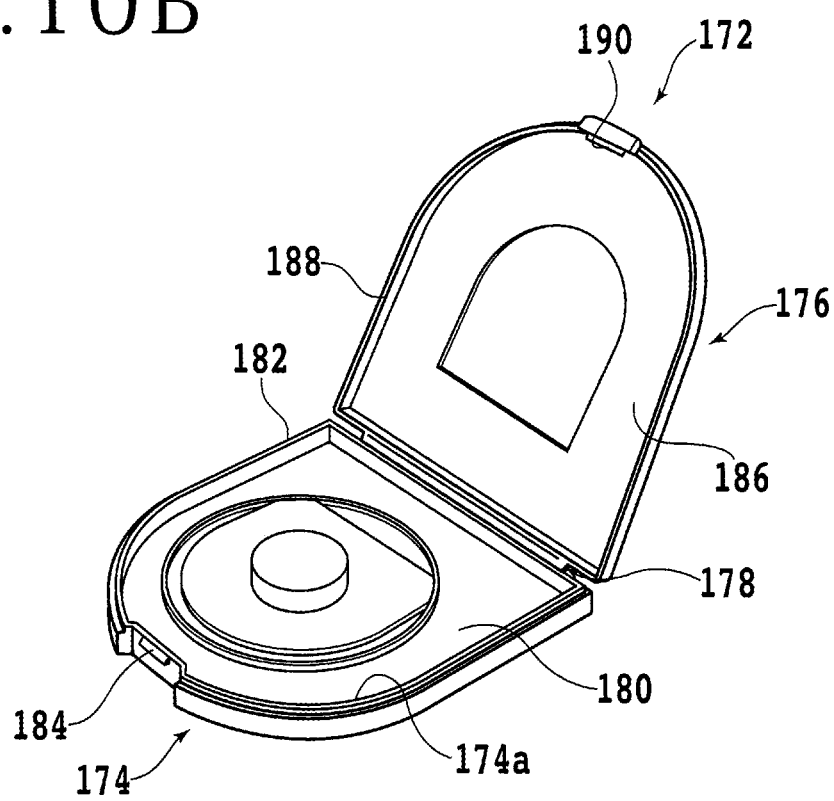
FIG. 10B is a perspective view of a blade case.

FIG. 10B illustrates one of the blade cases 172 in perspective. As illustrated in FIG. 10B, the blade case 172 includes, for example, a storage casing 174 and a lid 176, both made of synthetic resin such as polypropylene. The storage casing 174 and the lid 176 are coupled to each other by a hinge 178.

The storage casing 174 has a bottom plate 180 and a side wall 182 extending along an outer peripheral edge of the bottom plate 180. The storage casing 174 provides a storage area 174a defined inside of the side wall 182 for storing a cutting blade 36 or a cutting blade 52 therein. The side wall 182 includes a first hook 184 facing outwardly on an outer surface thereof opposite the hinge 178.

The lid 176 has a top plate 186 and a side wall 188 extending along an outer peripheral edge of the top plate 186. The height of the side wall 188 is lower than the height of the side wall 182 of the storage casing 174. The side wall 188 includes a second hook 190 facing inwardly on an outer surface thereof opposite the hinge 178.

When the lid 176 is turned about the hinge 178 toward the storage casing 174 until the lid 176 covers the storage casing 174, the lid 176 closes the storage area 174a to prevent the cutting blade 36 or the cutting blade 52 stored in the storage area 174a from being dislodged out of the blade case 172. When the first hook 184 and the second hook 190 intermesh each other in a locked state, the storage area 174a keeps itself closed by the lid 176. On the other hand, when the lid 176 is turned about the hinge 178 away from the storage casing 174, the storage area 174a is opened, allowing external access to the cutting blade 36 or the cutting blade 52 stored in the storage area 174a.

When a blade case 172 that stores a cutting blade 36 or a cutting blade 52 therein is placed to rest in one of the blade case supports 204, the cutting blade 36 or the cutting blade 52 is supported on the support unit 200. Each of the blade case supports 204 of the support unit 200 supports a blade case 172 with its lid 176 being open.

The support plate 202 also has on the upper surface 202a thereof a plurality of holder flange supports 206 for supporting respective holder flanges 62. For example, each of the holder flange supports 206 includes a recessed region shaped complementarily to a holder flange 62 and is capable of supporting a holder flange 62 rested therein. Alternatively, each of the holder flange supports 206 may be of a guide structure shaped complementarily to a holder flange 62.

In addition, the support plate 202 has on the upper surface 202a thereof a plurality of board supports 208 for supporting a dressing board 19 for use in dressing cutting blades 36 or cutting blades 52 and an inspection board 21 for use in inspecting cutting blades 36 or cutting blades 52.

For example, each of the board supports 208 is a recessed region shaped complementarily to a dressing board 19 or an inspection board 21 and is capable of supporting a dressing board 19 or an inspection board 21 rested therein. Alternatively, each of the board supports 208 may be of a guide structure shaped complementarily to a dressing board 19 or an inspection board 21.

When a cutting blade 36 or a cutting blade 52 processes, i.e., cuts, workpieces 11, a dressing process is carried out to intentionally wear the cutting edge of the cutting blade 36 or the cutting blade 52 on the dressing board 19 for the purpose of correcting the shape of the cutting blade 36 or the cutting blade 52 and keeping the cutting edge of the cutting blade 36 or the cutting blade 52 sharp enough.

The dressing process is carried out by having the cutting blade 36 or the cutting blade 52 cut into the dressing board 19. The dressing board 19 is made up of abrasive grains of green carborundum (GC), white alundum (WA), or the like that are bound together by a binder such as a resin bond or a vitrified bond, for example.

When the dressing process is carried out, the binder of the cutting blade 36 or the cutting blade 52 is worn away by contact with the dressing board 19, making the cutting blade 36 or the cutting blade 52 concentric with the spindle 34, i.e., shaping the cutting blade 36 or the cutting blade 52 into a true circle. At the same time, as the binder is worn away, the abrasive grains are exposed from the binder, i.e., the cutting blade 36 or the cutting blade 52 is dressed. The accuracy with which the workpiece 11 is processed by the cutting blade 36 or the cutting blade 52 thus dressed increases.

Further, when a cutting blade 36 or a cutting blade 52 processes, i.e., cuts, workpieces 11, another process is carried out using the inspection board 21 to inspect the shape of the cutting blade 36 or the cutting blade 52 and to correct the position of the cutting blade 36 or the cutting blade 52 by having the cutting blade 36 or the cutting blade 52 cut into the inspection board 21.

Specifically, for example, the cutting blade 36 or the cutting blade 52 is caused to cut into the inspection board 21, and a groove, i.e., a cut groove, formed in the inspection board 21 is observed to inspect whether the cutting edge of the cutting blade 36 or the cutting blade 52 is of a desired shape or not. Moreover, the position of the lower end of the cutting blade 36 or the cutting blade 52, i.e., the cut depth to which the cutting blade 36 or the cutting blade 52 has cut into the inspection board 21, is calculated on the basis of the depth of the cut groove formed in the inspection board 21, and the height of the cutting blade 36 or the cutting blade 52 is adjusted on the basis of the calculated cut depth.

The inspection board 21 includes a plate-shaped member made of silicon, i.e., a silicon board. However, the inspection board 21 is not limited to any particular material insofar as the cutting blade 36 or the cutting blade 52 can cut into the inspection board 21. For example, the inspection board 21 may be of the same material as the workpiece 11.

A cutting blade 36 or a cutting blade 52 cuts into a dressing board 19 or an inspection board 21 while the dressing board 19 or the inspection board 21 is being held on the sub-tables 26 (see FIG. 1). Specifically, for example, one of the sub-tables 26 holds thereon a dressing board 19 or an inspection board 21 to be cut by a cutting blade 36 or a cutting blade 52 mounted on one of the cutting units 30.

The other sub-table 26 holds thereon a dressing board 19 or an inspection board 21 to be cut by a cutting blade 36 or a cutting blade 52 mounted on the other cutting unit 30. Consequently, the sub-tables 26 are disposed in association with the respective cutting units 30.

Figure 11A:
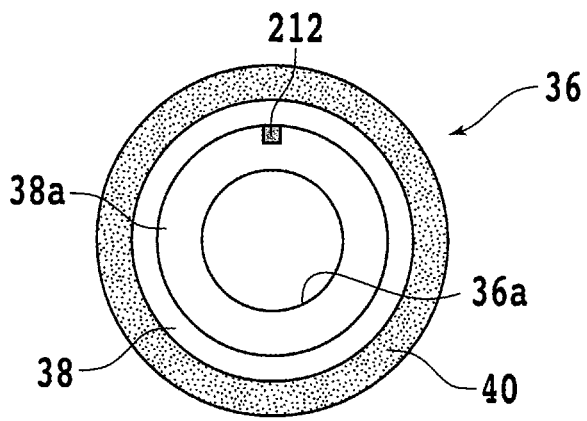
FIG. 11A is a plan view of a hub-type cutting blade with an identification mark attached thereto.
Figure 11B:
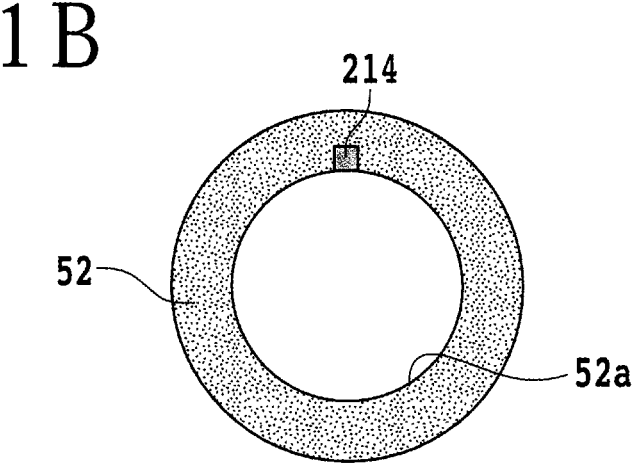
FIG. 11B is a plan view of a washer-type cutting blade with an identification mark attached thereto.
Figure 11C:
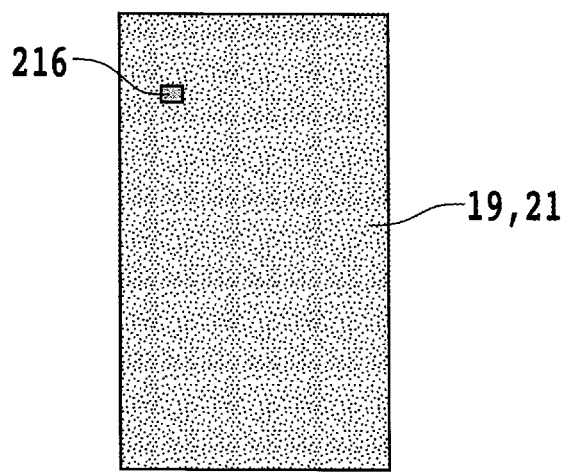
FIG. 11C is a plan view of a dressing board or an inspection board with an identification mark attached thereto.

The various tools supported on the support unit 200 may be assigned identification marks representing information regarding those tools. FIG. 11A illustrates in plan a cutting blade 36 with an identification mark 212 attached thereto. FIG. 11B illustrates in plan a cutting blade 52 with an identification mark 214 attached thereto. FIG. 11C illustrates in plan a dressing board 19 or an inspection board 21 with an identification mark 216 attached thereto.

The identification mark 212, the identification mark 214, and the identification mark 216 each include a one-dimensional code, i.e., a barcode, a two-dimensional code, or the like. The identification mark 212, the identification mark 214, and the identification mark 216 may be directly printed on the objects to be identified thereby or seals or the like with the identification mark 212, the identification mark 214, and the identification mark 216 printed thereon may be affixed to the objects to be identified thereby.

The identification mark 212 attached to the cutting blade 36 and the identification mark 214 attached to the cutting blade 52 contains information representing, for example, the kind, i.e., the hub type or the washer type, the outside diameter, the inside diameter, the thickness, i.e., the width, the material of the abrasive grains, the particle size of the abrasive grains, the material of the binder, the serial number, etc. of the cutting blade 36 and the cutting blade 52.

The identification mark 216 attached to the dressing board 19 contains information representing, for example, the size, the shape, the material of the abrasive grains, the particle size of the abrasive grains, the material of the binder, etc. of the dressing board 19. The identification mark 216 attached to the inspection board 21 contains information representing, for example, the size, the shape, the material, the serial number, etc. of the inspection board 21.

The identification mark 212 attached to the cutting blade 36, the identification mark 214 attached to the cutting blade 52, and the identification mark 216 attached to the dressing board 19 or the inspection board 21 are read by a reading unit included in the cutting apparatus 2, for example. The reading unit includes a camera, a barcode reader, or the like, which is selected depending on the kind of the identification mark 212, the identification mark 214, and the identification mark 216.

For example, the image capturing units 70 (see FIG. 1) that are positioned adjacent to the cutting units 30 also function as reading units for reading the identification mark 212, the identification mark 214, and the identification mark 216. However, reading units for reading those identification marks may be included in the cutting apparatus 2 separately from the image capturing units 70.

The information read from the identification marks by the reading units is input to the control unit (see FIG. 1) where the information is stored in the storage unit 82b. For example, for changing the cutting blade 36 or the cutting blade 52, the processing unit 82a of the control unit 82 refers to the information stored in the storage unit 82b and specifies an object to be held by the changer unit 76.

Each of the blade cases 172 should preferably have an identification mark attached thereto that corresponds to a cutting blade 36 or a cutting blade 52 to be stored therein. The identification mark thus attached to a blade case 172 makes it possible to confirm easily a mismatch between the blade case 172 and a cutting blade 36 or a cutting blade 52 to be stored therein.

In this case, the information read and acquired by the reading unit from the identification mark 212 attached to the cutting blade 36 or the identification mark 214 attached to the cutting blade 52, and the information read and acquired by the reading unit from the identification mark attached to the blade case 172 are stored in the storage unit 82b.

Thereafter, the processing unit 82a of the control unit 82 refers to the information stored in the storage unit 82b and determines whether the blade case 172 and the cutting blade 36 or the cutting blade 52 to be stored therein correspond to each other or not. Specifically, the processing unit 82a determines whether the information acquired from the identification mark 212 or the identification mark 214 and the information acquired from the identification mark attached to the blade case 172 correspond to each other or not. In this case, the processing unit 82a functions as a blade case determining unit for performing such a determining process.

Similarly, the processing unit 82a of the control unit 82 also can refer to the information stored in the storage unit 82b and determine whether the cutting blade 36 or the cutting blade 52 and a dressing board 19 or an inspection board 21 to be used correspond to each other or not. Specifically, the processing unit 82a determines whether the information acquired from the identification mark 212 or the identification mark 214 and the information acquired from the identification mark 216 correspond to each other or not. In this case, the processing unit 82a functions as a board determining unit for performing such a determining process.

Moreover, in a case where processing conditions including information that represents the types, etc. of cutting blades are stored in the storage unit 82b, the processing unit 82a of the control unit 82 can refer to the information stored in the storage unit 82b and determine whether the processing conditions and a cutting blade 36 or a cutting blade 52 to be processed correspond to each other or not. In this case, the processing unit 82a functions as a processing condition determining unit for performing such a determining process.

If the processing unit 82a determines that a blade case 172 and a cutting blade 36 or a cutting blade 52 to be stored therein do not correspond to each other, if the processing unit 82a determines that a cutting blade 36 or a cutting blade 52 and a dressing board 19 or an inspection board 21 to be used therewith do not correspond to each other, or if the processing unit 82a determines that processing conditions employed in cutting a workpiece 11 and a cutting blade 36 or a cutting blade 52 do not correspond to each other, then the control unit 82 may indicate such a discrepancy to the operator or the like or may shut down the cutting apparatus 2.

The support unit 200 described above is housed in the container 8 (see FIG. 1) included in the cutting apparatus 2. The support unit 200 is pulled out of the container 8 by the first delivery unit 72 and delivered onto the cover 78 that is in the closed state. An openable and closable door, not depicted, is disposed on one side of the container 8 that faces the cleaning unit 12. At the time at which the support unit 200 is to be removed from the container 8, the door is opened and the lifting and lowering stage 6*a* of the elevator 6 is lifted or lowered to vertically align the container 8 placed thereon with the guide rails 16.

The support plate 202 of the support unit 200 is similar in shape to the frames 15 that support respective workpieces 11. Therefore, the first delivery unit 72 can deliver the support unit 200 onto the cover 78 in the closed state in the same manner as it delivers a frame unit 17 onto the chuck table 22.

The destination to which the first delivery unit 72 delivers the support unit 200 is not limited to the cover 78. The first delivery unit 72 may deliver the support unit 200 onto the guide rails 16, for example. Furthermore, the cover 78 may be dispensed with, and the first delivery unit 72 may deliver the support unit 200 onto the chuck table 22.

A specific example of a process of changing cutting blades 36 or cutting blades 52 mounted on the cutting units 30 of the cutting apparatus 2 will be described below. In the example, the cutting blades 36 (see FIG. 2) mounted on the mount flanges 42 will be described below as cutting blades to be changed according to the changing process.

First, replacement cutting blades 36 are placed on the upper surface 202*a* of the support plate 202 of the support unit 200 (preparing step). Specifically, blade cases 172 housing respective replacement cutting blades 36, e.g., unused cutting blades 36, therein are placed on respective blade case supports 204A on the upper surface 202*a* of the support plate 202.

It is desirable that the blade cases 172 should be placed on the respective blade case supports 204 with the lids 176 being open. The lids 176 that remain open allows the replacement cutting blades 36 to replace the cutting blades 36 on the cutting units 30 properly even if the cutting apparatus 2 lacks an opening and closing unit for opening and closing the lids 176. The support unit 200 that supports the replacement cutting blades 36 housed in the blade cases 172 is housed in the container 8 (see FIG. 1).

Then, the first delivery unit 72 pulls the support unit 200 out of the container 8 and delivers the support unit 200 onto the cover 78 in the closed state. The replacement cutting blades 36 are now held on the cover 78. As described above, the support unit 200 may be placed on the guide rails 16 or the chuck table 22.

Figure 12A:
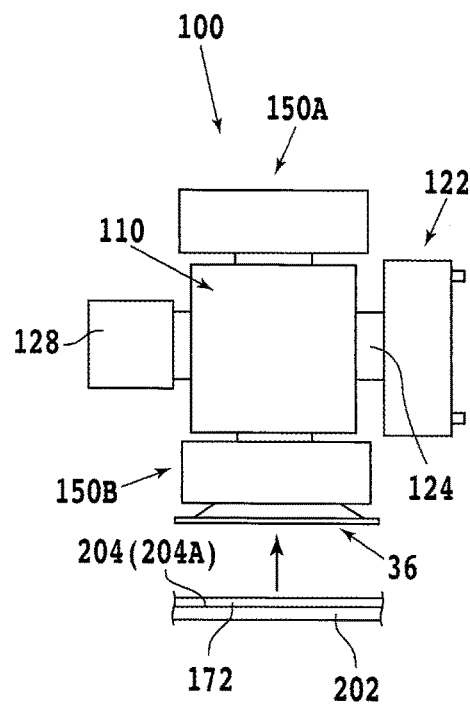
FIG. 12A is a schematic view of the changing device in a replacement cutting blade holding step.

Then, the holder 150B of the changing device 100 holds one of the replacement cutting blades 36 placed on the upper surface 202*a* of the support plate 202 (replacement cutting blade holding step). FIG. 12A schematically illustrates the changing device 100 in the replacement cutting blade holding step.

In the replacement cutting blade holding step, the lifting and lowering mechanism 86 and the articulated arm 90 (see FIGS. 4 and 5) move the changing device 100 and place the changing device 100 in a blade transfer position over the support plate 202 held on the cover 78, etc. The rotating mechanism 104 (see FIG. 6, etc.) turns the frame 110 to cause the holder 150B to face the upper surface 202*a* of the support plate 202.

Then, the changing device 100 is lowered to bring the holder 150B into contact with the replacement cutting blade 36 placed on the upper surface 202*a* of the support plate 202. The holder 150B then holds the replacement cutting blade 36 under suction. Thereafter, the changing device 100 is lifted to move the holder 150B away from the upper surface 202*a* of the support plate 202. The replacement cutting blade 36 is now lifted off the upper surface 202*a* of the support plate 202 by the holder 150B.

Figure 12B:
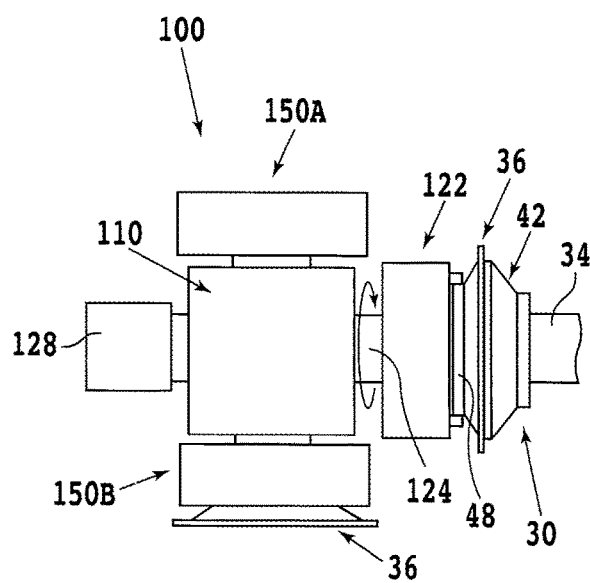
FIG. 12B is a schematic view of the changing device in a nut removing step.

Then, the nut 48 mounted on the mount flange 42 of one of the cutting units 30 is removed from the mount flange 42 (nut removing step). FIG. 12B schematically illustrates the changing device 100 in the nut removing step. In the nut removing step, the lifting and lowering mechanism 86 and the articulated arm 90 (see FIGS. 4 and 5) move the changing device 100 and place the changing device 100 in the processing chamber cover 28 (see FIG. 1). The nut holder 122 of the changing device 100 is brought into facing relation to the mount flange 42 on which the cutting blade 36 and the nut 48 are mounted.

The nut holder 122 then holds and rotates the nut 48 mounted on the mount flange 42. Specifically, while the gripping members 134 (see FIG. 6, etc.) are gripping the nut 48, the rotary actuator 128 rotates the rotational member 130 (see FIG. 6, etc.) to rotate the nut 48 in the first direction around the rotational axis 124*a*, i.e., the direction to loosen the nut 48. As a result, the nut 48 is loosened and removed from the mount flange 42.

Figure 12C:
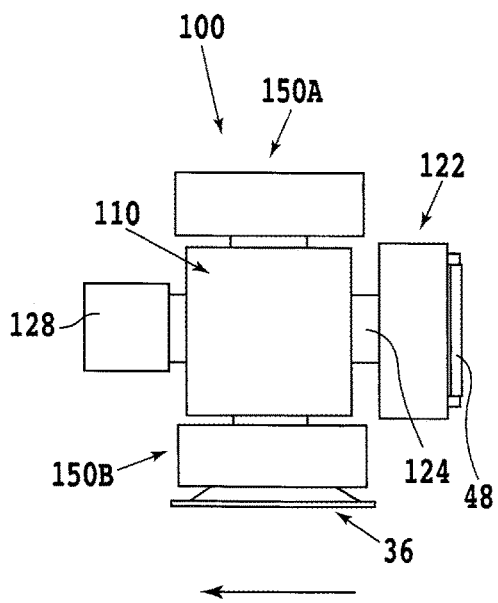
FIG. 12C is a schematic view of the changing device in a first retracting step.

Then, the nut holder 122 and the mount flange 42 are spaced apart from each other (first retracting step). FIG. 12C schematically illustrates the changing device 100 in the first retracting step. In the first retracting step, the articulated arm 90 (see FIGS. 4 and 5) moves the changing device 100 away from the mount flange 42. The nut holder 122 now moves away from the mount flange 42 while holding the nut 48.

Figure 12D:
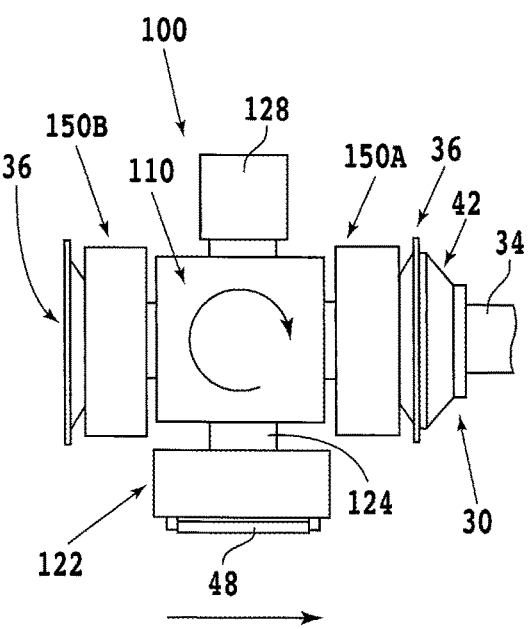
FIG. 12D is a schematic view of the changing device in a used cutting blade holding step.

Then, the holder 150A of the changing device 100 holds the cutting blade 36, e.g., a used cutting blade 36, mounted on the mount flange 42 of the cutting unit 30 (used cutting blade holding step). FIG. 12D schematically illustrates the changing device 100 in the used cutting blade holding step.

In the used cutting blade holding step, the rotational member 106 (see FIG. 6, etc.) of the rotating mechanism 104 is rotated to bring the surface 150*a* (see FIG. 8A, etc.) of the holder 150A into facing relation to the mount flange 42. The changing device 100 is moved toward the mount flange 42 to cause the holder 150A to contact the used cutting blade 36 mounted on the mount flange 42. Then, the holder 150A holds the used cutting blade 36 under suction.

Figure 13A:
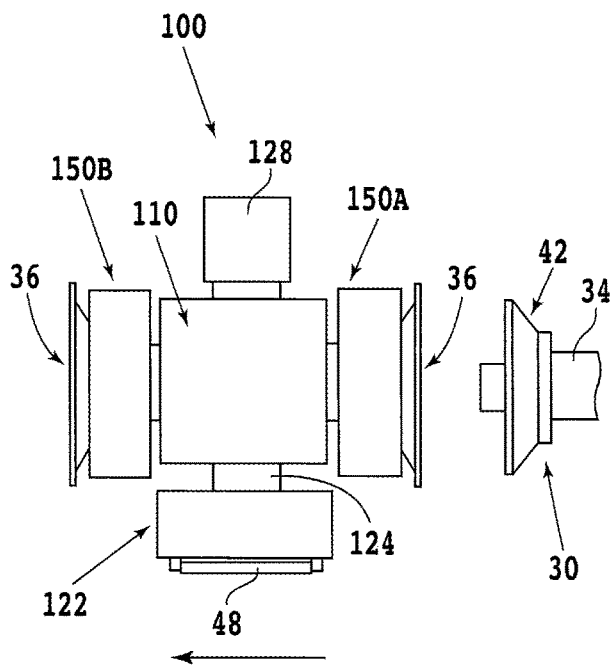
FIG. 13A is a schematic view of the changing device in a second retracting step.

Then, the holder 150A and the mount flange 42 are spaced apart from each other (second retracting step). FIG. 13A schematically illustrates the changing device 100 in the second retracting step. In the second retracting step, the articulated arm 90 (see FIGS. 4 and 5) moves the changing device 100 away from the mount flange 42. The holder 150A now moves away from the mount flange 42 while holding the used cutting blade 36, dismounting the used cutting blade 36 from the mount flange 42.

Figure 13B:
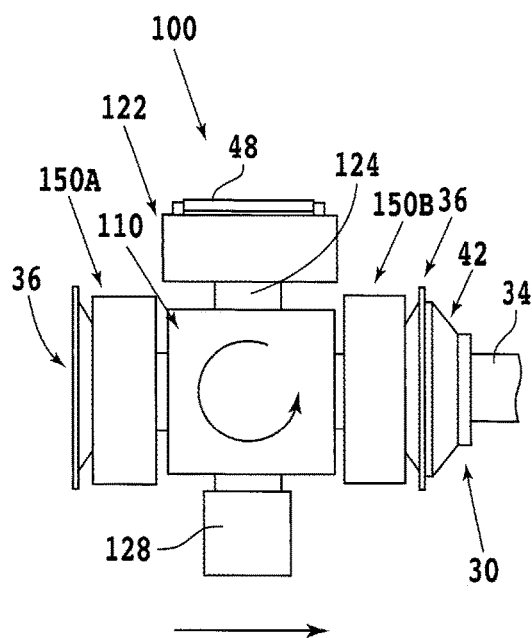
FIG. 13B is a schematic view of the changing device in a cutting blade mounting step.

Then, the replacement cutting blade 36 held by the holder 150B of the changing device 100 is mounted on the mount flange 42 (cutting blade mounting step). FIG. 13B schematically illustrates the changing device 100 in the cutting blade mounting step. In the cutting blade mounting step, the rotational member 106 (see FIG. 6, etc.) of the rotating mechanism 104 is rotated to bring the surface 150*a* (see FIG. 8A, etc.) of the holder 150B that is holding the replacement cutting blade 36 into facing relation to the mount flange 42.

Then, the changing device 100 is moved toward the mount flange 42 to position the replacement cutting blade 36 such that the boss 46 (see FIG. 2) of the mount flange 42 is inserted into the opening 36*a* (see FIG. 2) in the replacement cutting blade 36. When the replacement cutting blade 36 is then released from the holder 150B, the replacement cutting blade 36 is mounted on the mount flange 42.

Figure 13C:
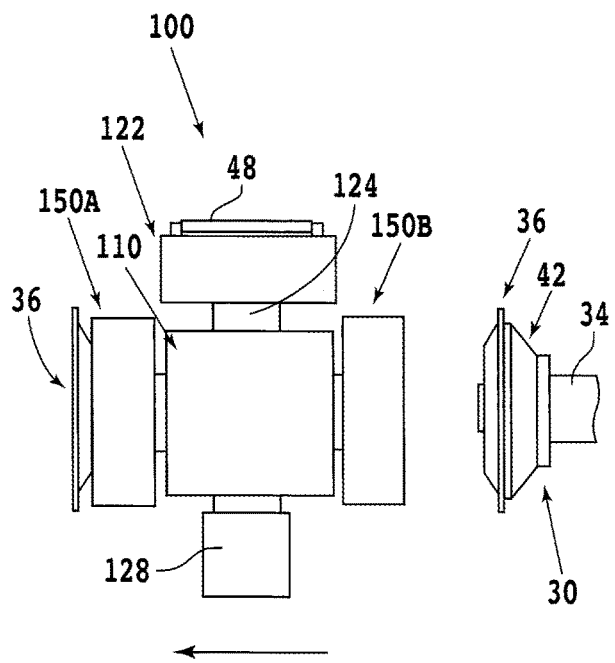
FIG. 13C is a schematic view of the changing device in a third retracting step.

Then, the holder 150B and the mount flange 42 are spaced apart from each other (third retracting step). FIG. 13C schematically illustrates the changing device 100 in the third retracting step. In the third retracting step, the articulated arm 90 (see FIGS. 4 and 5) moves the changing device 100 away from the mount flange 42. The holder 150B now moves away from the mount flange 42 and is spaced apart from the replacement cutting blade 36 mounted on the mount flange 42.

Figure 13D:
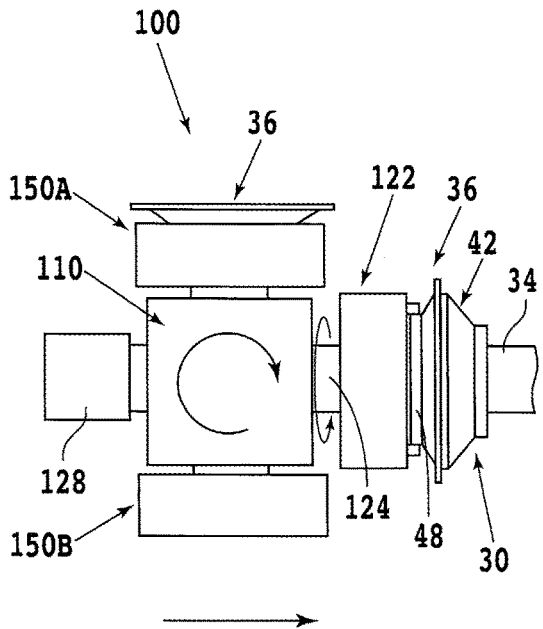
FIG. 13D is a schematic view of the changing device in a nut mounting step.

Then, the nut 48 held by the nut holder 122 is mounted on the mount flange 42 (nut mounting step). FIG. 13D schematically illustrates the changing device 100 in the nut mounting step. In the nut mounting step, the rotational member 106 (see FIG. 6, etc.) of the rotating mechanism 104 is rotated to cause the nut holder 122 holding the nut 48 to face the mount flange 42. The changing device 100 is moved toward the mount flange 42 to position the nut 48 at the distal end portion of the boss 46 (see FIG. 2) of the mount flange 42.

The rotary actuator 128 rotates the rotational member 130 (see FIG. 6, etc.) to rotate the nut 48 gripped by the gripping members 134 (see FIG. 6, etc.) in the second direction, i.e., a direction to tighten the nut 48. The nut 48 is now tightened over the boss 46 (see FIG. 2) of the mount flange 42, and hence mounted on the mount flange 42. The replacement cutting blade 36 is thus sandwiched between the mount flange 42 and the nut 48, and secured to the distal end portion of the spindle 34.

The cutting blade 36 mounted on the mount flange 42 has been changed according to the above sequence. The used cutting blade 36 held by the holder 150A is placed on one of the blade case supports 204A of the support unit 200.

In the above changing process, the mount flange 42 and the changing device 100 may be moved toward and away from each other by moving the cutting unit 30, i.e., the mount flange 42. For example, in the first retracting step, the second retracting step, and the third retracting step, the cutting unit 30 may be moved away from the changing device 100 along one of the Y-axis directions to space the changing device 100 and the mount flange 42 apart from each other.

In the above changing process, the changing of the cutting blade 36 mounted on the mount flange 42 has been described. The cutting blade 52 (see FIG. 3) mounted on the mount flange 54 may be changed in the same fashion as the cutting blade 36 mounted on the mount flange 42. When the cutting blade 52 is to be changed, however, the cutting blade 52 and the holder flange 62 are held by the holder 150A and the holder 150B (see FIG. 9B), as described above. In other words, the cutting blade 52 and the holder flange 62 are changed instead of the cutting blade 36.

For changing the cutting blade 52, moreover, the holder 150B holds the holder flange 62 and thereafter holds the cutting blade 52 in the replacement cutting blade holding step. Specifically, the holder 150B is caused to face the holder flange 62 supported on one of the holder flange supports 206 (see FIG. 10A), and then holds the holder flange 62.

Then, the holder 150B that is holding the holder flange 62 is brought into facing relation to a replacement cutting blade 52 in one of the blade cases 172 supported on one of the blade case supports 204 (see FIG. 10A), and holds the replacement cutting blade 52 as well as the holder flange 62. At this time, the replacement cutting blade 52 is held by the holder 150B under a negative pneumatic pressure that is transmitted from the suction source 160 and that acts on the cutting blade 52 through the through holes 62d (see FIG. 9B) in the holder flange 62.

The changing device 100 is also capable of changing the dressing board 19 or the inspection board 21 (see FIG. 10A) held on each of the sub-tables 26 (see FIG. 1). When a cutting blade 36 or a cutting blade 52 is dressed by the dressing board 19, for example, the cutting blade 36 or the cutting blade 52 forms a cut groove in the dressing board 19.

When the dressing board 19 has had cut grooves formed over its entire surface by dressing numerous cutting blades 36 or cutting blades 52, the dressing board 19 is replaced as a used dressing board with a replacement dressing board 19, e.g., an unused dressing board 19. Similarly, an inspection board 21 that has been used to inspect cutting blades 36 or cutting blades 52 is also replaced with a replacement inspection board 21, e.g., an unused inspection board 21, at an appropriate timing.

The holder 150A and the holder 150B of the changing device 100 are capable of holding plate-shaped members that include not only cutting blades 36 and cutting blades 52, but also dressing boards 19 and inspection boards 21. Consequently, the changing device 100 can change dressing boards 19 and inspection boards 21 held on the sub-tables 26.

Figure 14A:
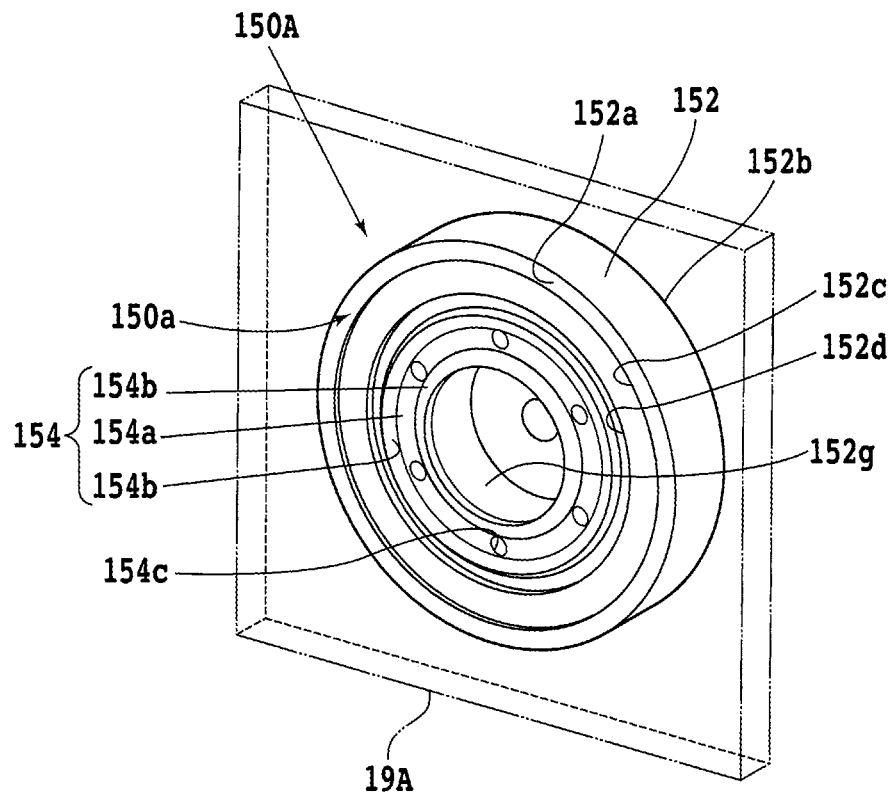
FIG. 14A is a perspective view of the holder as it is holding a square dressing board.

FIG. 14A illustrates in perspective view the holder 150A as it is holding a square dressing board 19, depicted as a dressing board 19A. The dressing board 19A illustrated in FIG. 14A is of a size large enough to cover the entire face side 152a of the frame 152. In FIG. 14A, the dressing board 19A has its outline indicated by the two-dot-and-dash lines.

For holding the dressing board 19A on the holder 150A, the lips 154b of the elastic member 154 are brought into contact with the dressing board 19A. At this time, the holder 150A is positioned such that the elastic member 154 is covered in its entirety by the dressing board 19A. The space between the lips 154b is now closed by the dressing board 19A. The dressing board 19A is held under suction by the holder 150A under a negative pneumatic pressure that is transmitted from the suction source 160 (see FIG. 8B) and that acts in the space between the lips 152b.

Figure 14B:
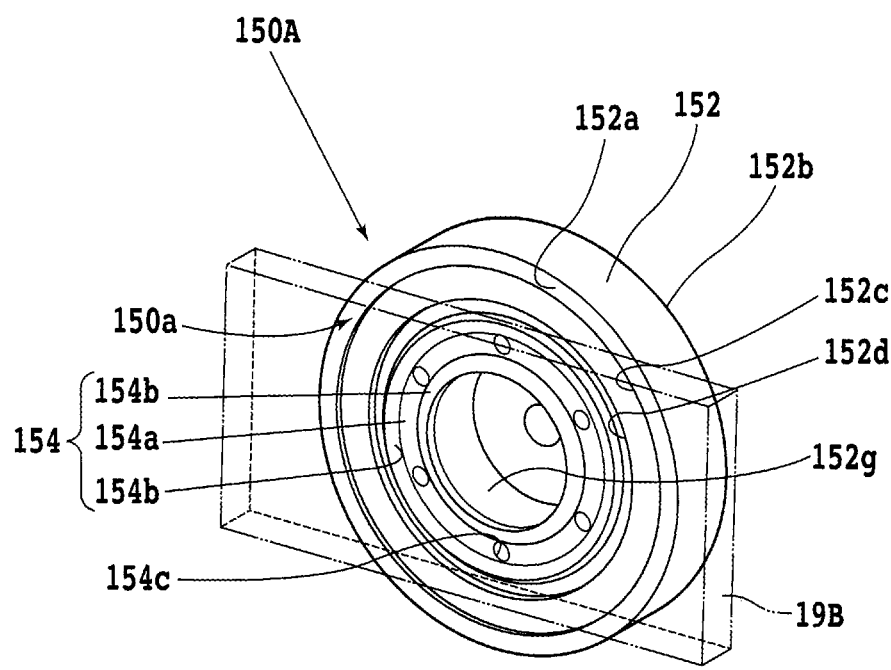
FIG. 14B is a perspective view of the holder as it is holding an elongate rectangular dressing board.

The dressing board 19 to be held by the holder 150A is not essentially limited to any size and shape. FIG. 14B illustrates in perspective view the holder 150A as it is holding an elongate rectangular dressing board 19, depicted as a dressing board 19B. The dressing board 19B illustrated in FIG. 14B has longer sides longer than the diameter of the frame 152 and shorter sides shorter than the diameter of the frame 152. However, the shorter sides of the dressing board 19B are longer than the diameter of the elastic member 154.

For holding the dressing board 19B on the holder 150A, the lips 154b of the elastic member 154 are brought into contact with the dressing board 19B. At this time, the holder 150A is positioned such that the elastic member 154 is covered in its entirety by the dressing board 19B. The space between the lips 154b is now closed by the dressing board 19B. The dressing board 19B is held under suction by the holder 150B under a negative pneumatic pressure that is transmitted from the suction source 160 (see FIG. 8B) and that acts in the space between the lips 154b.

The holder 150A may hold the dressing board 19 in various fashions other than the details described above. For example, the holder 150A may hold the dressing board 19 with the lips 154b kept out of contact with the dressing board 19. The lips 154b kept out of contact with the dressing board 19 are prevented from being worn by contacting the dressing board 19.

Specifically, the lips 154b may have their tip ends not protruding from the face side 152a of the frame 152 but disposed within the first groove 152c. With this arrangement, the holder 150A can hold the dressing board 19A such that the lips 154b are kept out of contact with the dressing board 19A (FIG. 14A).

Specifically, the holder 150A is positioned such that the first groove 152c is covered in its entirety by the dressing board 19A. At this time, the dressing board 19A is supported by the face side 152a of the frame 152 and kept out of contact with the lips 154b. When a negative pneumatic pressure from the suction source 160 (see FIG. 8B) acts in the first groove 152c, the dressing board 19A is held under suction on the holder 150A.

The holder 150A may include a mechanism for ejecting a gas such as air to hold the dressing board 19 out of contact therewith according to the Bernoulli effect. Even when the dressing board 19B that is sized and shaped not to cover the first groove 152c in its entirety, as illustrated in FIG. 14B, the holder 150A with such a mechanism is able to hold the dressing board 19B out of contact with the lips 154b.

FIGS. 14A and 14B illustrate the manner in which the dressing board 19 is held by the holder 150A. However, the holder 150B is also able to hold the dressing board 19 in a similar manner. The holder 150A and the holder 150B are able to hold the inspection board 21 in the same manner as the dressing board 19.

Next, a specific example of a process of changing a dressing board 19 and an inspection board 21 held on the sub-tables 26 of the cutting apparatus 2 will be described below. In the example, a dressing board 19 that is used to dress cutting blades 36 or cutting blades 52 will be described below as a board to be changed according to the changing process.

First, a replacement dressing board 19 is placed on the upper surface 202a of the support plate 202 of the support unit 200 (see FIG. 10A) (preparing step). Specifically, a replacement dressing board 19, e.g., an unused dressing board 19, is placed on the one of the board supports 208 on the upper surface 202a of the support plate 202. The support unit 200 that supports the replacement dressing board 19 is housed in the container (see FIG. 1).

The support unit 200 is pulled out of the container 8 by the first delivery unit 72 and delivered onto the cover 78 that is in the closed state. The replacement dressing boards 19 are now prepared on the cover 78. Alternatively, the support unit 200 may be positioned on the guide rails 16 or the chuck table 22.

Figure 15A:
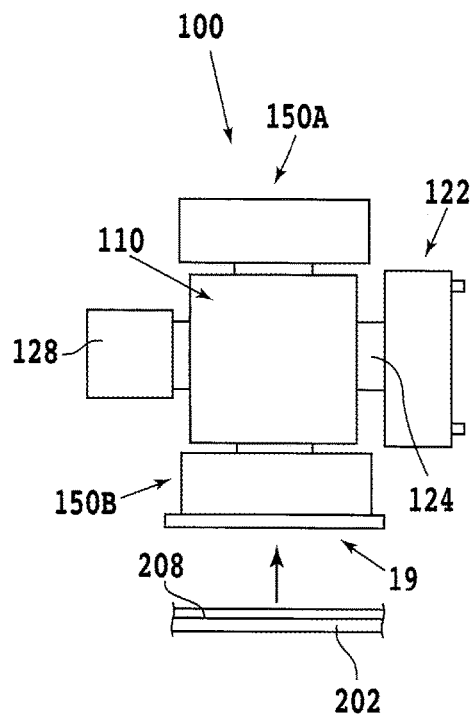
FIG. 15A is a schematic view of the changing device in a replacement board holding step.

Then, the holder 150B of the changing device 100 holds the replacement dressing board 19 placed on the upper surface 202a of the support plate 202 (replacement board holding step). FIG. 15A schematically illustrates the changing device 100 in the replacement board holding step.

In the replacement board holding step, the lifting and lowering mechanism 86 and the articulated arm 90 (see FIGS. 4 and 5) move the changing device 100 and place the changing device 100 in a board transfer position over the support plate 202 held on the cover 78. The rotating mechanism 104 (see FIG. 6, etc.) turns the frame 110 to cause the holder 150B to face the upper surface 202a of the support plate 202.

Then, the changing device 100 is lowered to bring the holder 150B into contact with the replacement dressing board 19 placed on the upper surface 202a of the support plate 202. The holder 150B then holds the replacement dressing board 19 under suction. Thereafter, the changing device 100 is lifted to move the holder 150B away from the upper surface 202a of the support plate 202. The replacement dressing board 19 is now lifted off the upper surface 202a of the support plate 202 by the holder 150B.

Figure 15B:
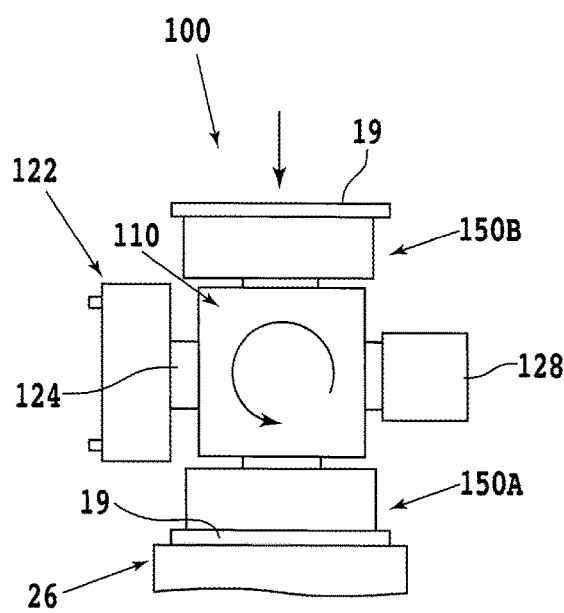
FIG. 15B is a schematic view of the changing device in a used board holding step.

Then, the holder 150A of the changing device 100 holds a used dressing board 19 held on one of the sub-tables 26 (used board holding step). FIG. 15B schematically illustrates the changing device 100 in the used board holding step.

In the used board holding step, the lifting and lowering mechanism 86 and the articulated arm 90 (see FIGS. 4 and 5) move the changing device 100 and place the changing device 100 in a loading and unloading position over the sub-table 26 on which the used dressing board 19 is positioned. The rotational member 106 (see FIG. 6, etc.) of the rotating mechanism 104 is rotated to cause the holder 150A to face the sub-table 26.

The changing device 100 is moved toward the sub-table 26 to bring the holder 150A into contact with the used dressing board 19 held on the sub-table 26. Thereafter, the holder 150A holds the used dressing board 19 under suction.

Figure 15C:
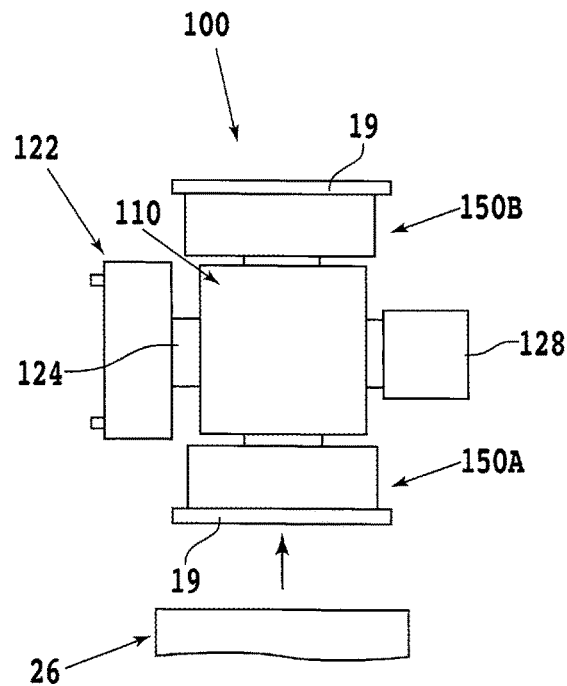
FIG. 15C is a schematic view of the changing device in a retracting step.

Then, the holder 150A and the sub-table 26 are spaced apart from each other (retracting step). FIG. 15C schematically illustrates the changing device 100 in the retracting step. In the retracting step, the lifting and lowering mechanism 86 (see FIGS. 4 and 5) lifts the changing device 100, moving the changing device 100 away from the sub-table 26. The holder 150A that is holding the used dressing board 19 is moved away from the sub-table 26, and hence lifts the used dressing board 19.

Figure 15D:
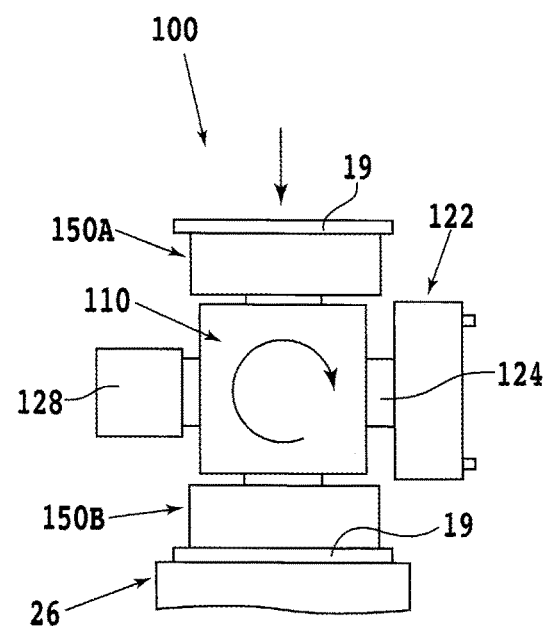
FIG. 15D is a schematic view of the changing device in a placing step.

Then, the replacement dressing board 19 that is held by the holder 150B of the changing device 100 is placed on the sub-table 26 (placing step). FIG. 15D schematically illustrates the changing device 100 in the placing step.

In the placing step, the rotational member 106 (see FIG. 6, etc.) of the rotating mechanism 104 is rotated to bring the holder 150B that is holding the replacement dressing board 19 into facing relation to the sub-table 26. The changing device 100 is moved toward the sub-table 26 to position the replacement dressing board 19 over the sub-table 26. Thereafter, when the replacement dressing board 19 is released from the holder 150B, the replacement dressing board 19 is placed on the sub-table 26.

The dressing board 19 held on the sub-table 26 has been changed according to the above sequence. The used dressing board 19 held by the holder 150A is placed on one of the board supports 208 of the support unit 200. In the above changing process, the changing of the dressing board 19 has been described. In a case where an inspection board 21 is placed on one of the sub-tables 26, the inspection board 21 can be changed in the same manner as the dressing board 19.

As described above, the cutting apparatus 2 according to the present embodiment includes a support unit 200 for supporting a cutting blade 36 or a cutting blade 52 housed in a blade case 172, a cutting unit 30 including a mount flange 42 on which a cutting blade 36 is to be mounted or a mount flange 54 on which a cutting blade 52 is to be mounted, a changing device, i.e., a changing mechanism, 100 for attaching a cutting blade 36 or a cutting blade 52 supported on the support unit 200 to the mount flange 42 or the mount flange 54, and a moving unit, i.e., a moving mechanism, 84 for moving the changing device 100.

Consequently, by supporting a cutting blade 36 or a cutting blade 52 housed in the blade case 172 on the support unit 200 and moving the changing device 100 with the moving unit 84, it is possible to change the cutting blade 36 or the cutting blade 52 on the cutting unit 30. In other words, the cutting apparatus 2 according to the present embodiment makes it unnecessary to manually remove the cutting blade 36 or the cutting blade 52 from the blade case 172 as in the existing technology.

Figure 16:
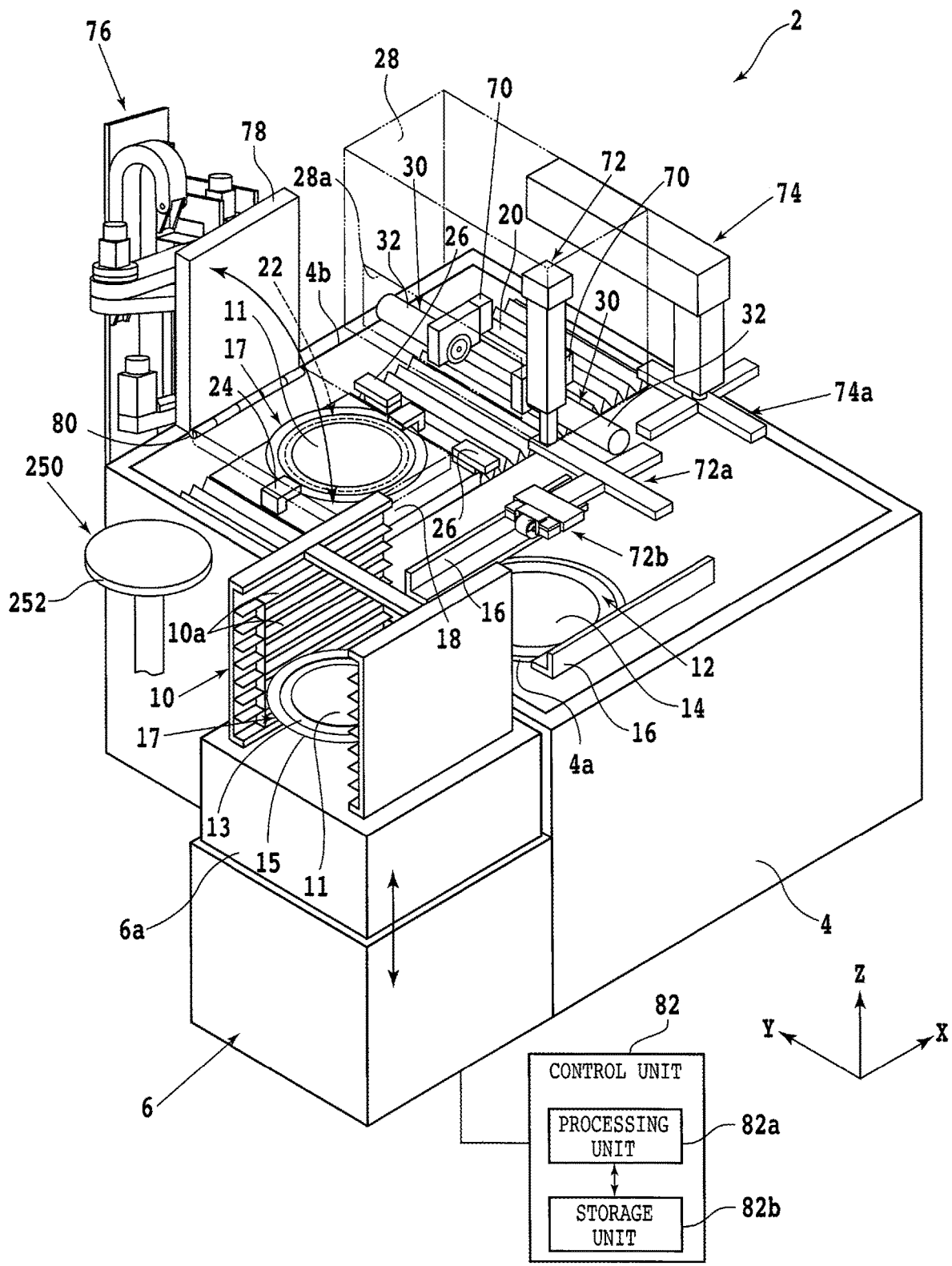
FIG. 16 is a perspective view of a cutting apparatus including a support unit according to a modification.

The present invention is not limited to the details of the embodiment describe above, and various changes and modifications may be made therein. FIG. 16 illustrates in perspective a cutting apparatus 2 including a support unit, i.e., a stocker, 250 according to a modification. The support unit 250 included in the cutting apparatus 2 illustrated in FIG. 16 includes the rotary support unit 250, instead of the container 8 (see FIG. 1), for the rotary support unit 250 supporting various tools used on the cutting apparatus 2, disposed in the vicinity of the changer unit 76. For example, the support unit 250 is disposed in a region adjacent to the opening 4b in the base 4.

The support unit 250 is arranged to support tools including cutting blades 36, cutting blades 52, holder flanges 62, dressing boards 19, inspection boards (see FIG. 10A), etc. Specifically, the support unit 250 includes a support plate, i.e., a support base, 252 for supporting the various tools placed thereon.

Figure 17:
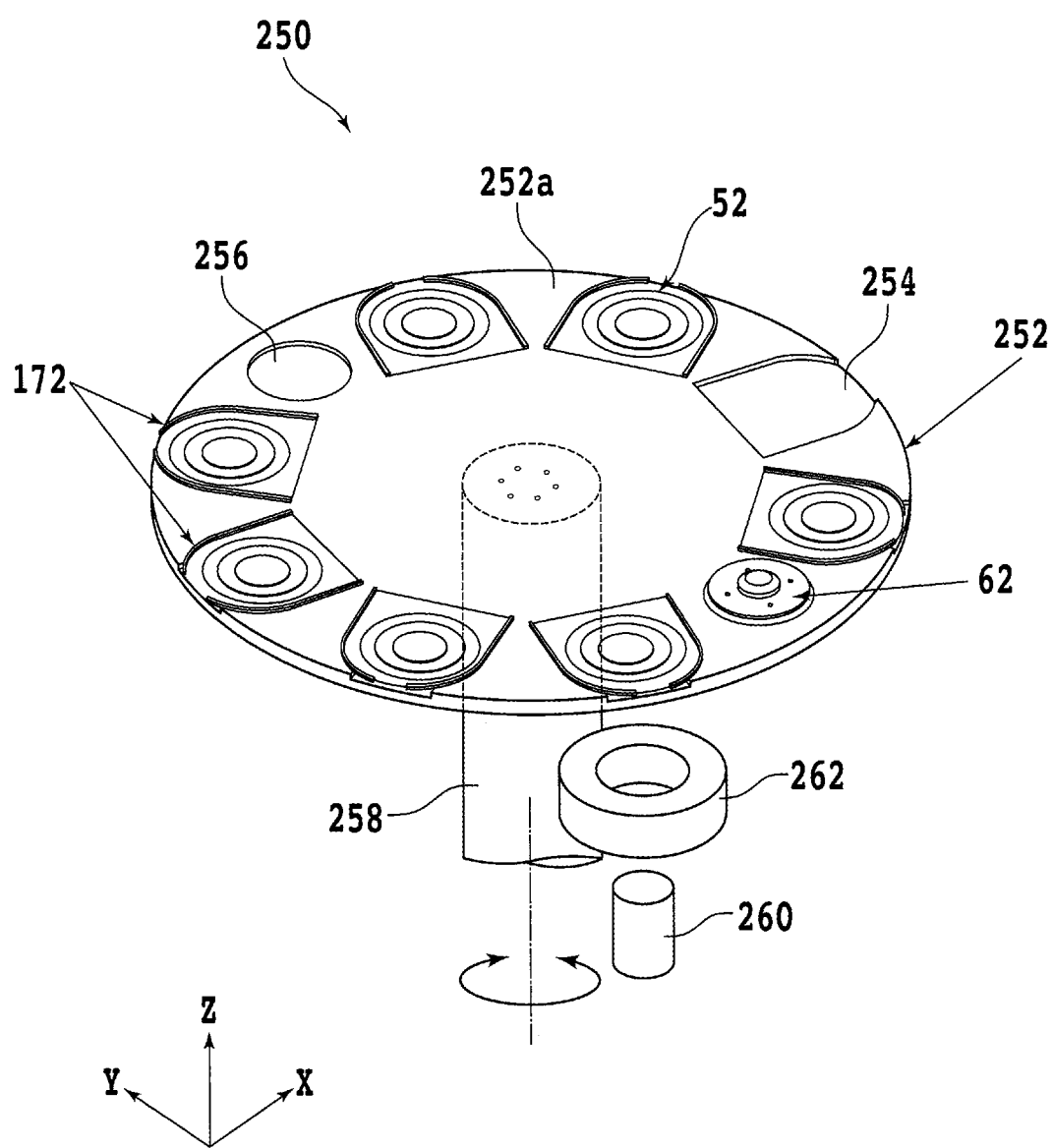
FIG. 17 is a perspective view of the support unit including a rotatable support plate.

FIG. 17 illustrates in perspective the support unit 250 including a rotatable support plate 252. For example, the support plate 252 is a disk-shaped member having an upper surface 252a on which there are disposed a plurality of blade case supports 254 each capable of supporting a blade case 172 that houses a cutting blade 52 therein. In FIG. 17, the blade case 172 has its lid, which may be similar to the lid 176 illustrated in FIG. 10B, omitted from illustration.

For example, each of the blade case supports 254 is a recessed region shaped complementarily to a blade case 172 and is capable of supporting a blade case 172 rested therein. Alternatively, each of the blade case supports 254 may be of a guide structure shaped complementarily to a blade case 172.

The support plate 252 also has on the upper surface 252a thereof a plurality of holder flange supports 256 for supporting respective holder flanges 62. For example, each of the holder flange supports 256 is a recessed region shaped complementarily to a holder flange 62 and is capable of supporting a holder flange 62 rested therein. Alternatively, each of the holder flange supports 256 may be of a guide structure shaped complementarily to a holder flange 62.

The blade case supports 254 and the holder flange supports 256 are angularly spaced at substantially equal intervals circumferentially along the support plate 252. A shaft, i.e., a rotating mechanism, 258 rotatable by the power transmitted from a rotary actuator, i.e., a rotating mechanism, not depicted, such as an electric motor is coupled to the lower surface of a central portion of the support plate 252. When the rotary actuator rotates the shaft 258 about its central axis, the support plate 252 is rotated about a rotational axis generally parallel to the Z-axis directions. The blade case supports 254 and the holder flange supports 256 are arrayed along the directions in which the support plate 252 is rotatable by the shaft 258.

Below the support plate 252, there are disposed a reading unit 260 for reading identification marks 214, etc. attached to cutting blades 52 and a ring-shaped light source 262 for illuminating the identification marks 214, etc. For example, cutting blades 52 are supported on the blade case supports 254 by the blade cases 172 such that the surfaces of the cutting blades 52 to which the identification marks 214 are attached face downwardly.

The reading unit 260 includes, for example, a visible-light camera, an infrared-ray camera, or the like, and reads the identification marks 214 attached to the cutting blades 52 through the support plate 252 and the blade cases 172. The materials of the support plate 252 and the blade cases 172 are selected depending on the kind of the reading unit 260.

For example, if the reading unit 260 includes a visible-light camera, then the support plate 252 and the blade cases 172 are made, wholly or partly, of a material that transmits visible light therethrough. Specifically, the support plate 252 is made, wholly or partly, of a transparent material such as plastic, e.g., polypropylene or the like, glass, e.g., quartz glass or borosilicate glass, or the like. The blade cases 172 are made, wholly or partly, of a transparent material such as plastic, e.g., polypropylene or the like.

The materials of the support plate 252 and the blade cases 172 may be changed as desired depending on the kind of the reading unit 260. For example, if the reading unit 260 includes an infrared-ray camera, then the support plate 252 and the blade cases 172 are made, wholly or partly, of a material that transmits infrared radiation therethrough.

When the support plate 252 is rotated to position the reading unit 260 directly below a desired one of the blade case supports 254, the reading unit 260 can read the identification mark 214 attached to the cutting blade 52 that is supported on the desired blade case support 254 through the blade case 172.

The information of the identification mark 214 read by the reading unit 260 is output to the control unit 82 (see FIG. 16). The reading unit 260 may be disposed above the support plate 252. In this case, the cutting blades 52 are supported on the blade case supports 254 by the blade cases 172 such that the surfaces of the cutting blades 52 to which the identification marks 214 are attached are exposed upwardly.

Blade cases 172 that house cutting blades 36 may be placed on the blade case supports 254 on the support plate 252. The support plate 252 may have on its upper surface 252a a plurality of board supports, which are similar to the board supports 208 illustrated in FIG. 10A, for supporting dressing boards 19 and inspection boards 21.

Figure 18:
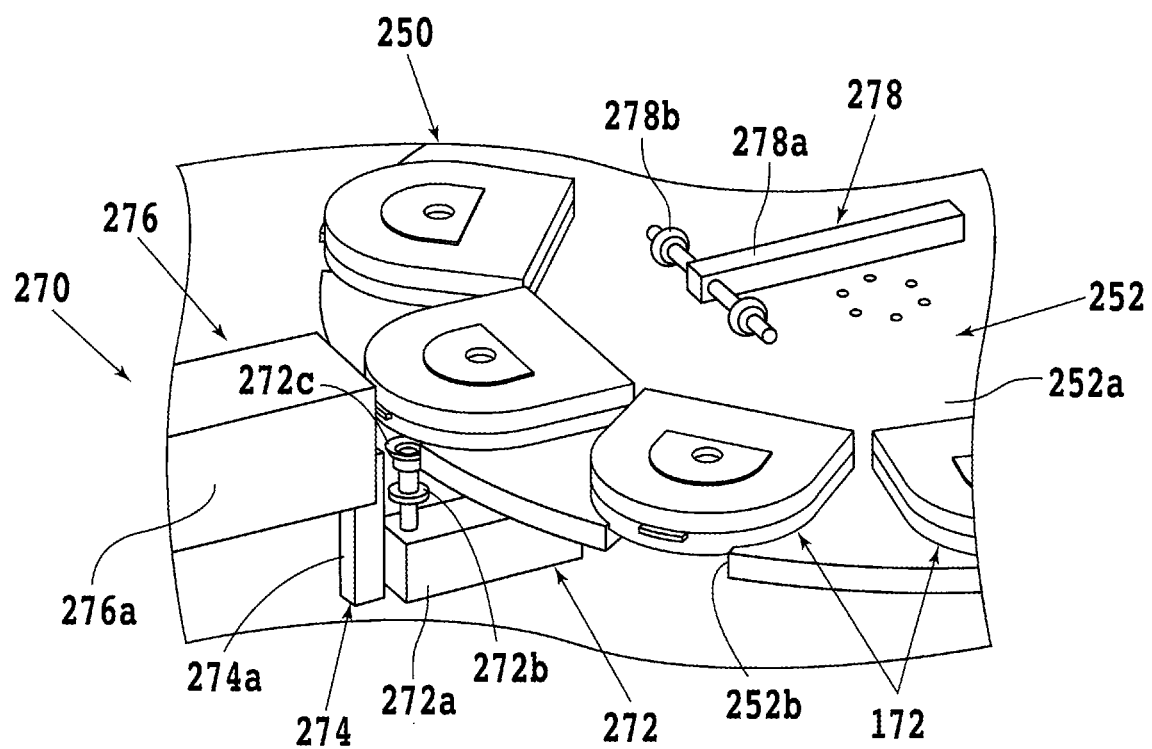
FIG. 18 is a perspective view of an opening and closing unit.

An opening and closing unit for opening and closing the lids 176 of the blade cases 172 supported on the support plate 252 is disposed in the vicinity of the support unit 250 thus constructed. FIG. 18 illustrates in perspective the opening and closing unit, denoted by 270. The opening and closing unit 270 includes a holding mechanism 272 disposed below the support plate 252, for example, for holding under suction and securing, from below, the storage casing 174 of the blade case 172 placed on one of the blade case supports 254.

The holding mechanism 272 includes a box-shaped base 272a housing therein an actuator, not depicted, such as an electric motor. The base 272a has two openings, for example, defined in an upper surface thereof. Two tubular holding rods 272b that can be lifted and lowered by the power of the actuator have respective lower ends inserted in the respective openings.

Suction pads 272c shaped as suction cups are mounted on the respective upper ends of the holding rods 272b. The suction pads 272c are used in contact with the bottom plate 180 of the storage casing 174 of the blade case 172. The suction pads 272c are held in fluid communication with a suction source, not depicted, such as an ejector, through fluid channels, etc. defined in the holding rods 272b.

An unlocking mechanism 274 for lifting the lid 176 of the blade case 172 secured by the holding mechanism 272 to unlock the first hook 184 and the second hook 190 from each other is disposed laterally of the holding mechanism 272. The unlocking mechanism 274 includes a push rod 274a that can be lifted and lowered by an actuator, not depicted, such as an electric motor. Alternatively, the unlocking mechanism 274 may include an air cylinder or the like for lifting and lowering the push rod 274a under pneumatic pressure.

A pushing mechanism 276 for further opening the lid 176 of the blade case 172 after the first hook 184 and the second hook 190 have been unlocked from each other and the lid 176 has been lifted from the storage casing 174 is disposed laterally of the unlocking mechanism 274 and the support plate 252.

The pushing mechanism 276 includes a box-shaped base 276a housing therein an actuator, not depicted, such as an electric motor. The base 276a has an opening, for example, defined in a side surface thereof that faces the support plate 252. A push rod 276b (see FIG. 19A, etc.) movable laterally by the power of the actuator has an end inserted in the opening in the base 276a.

A locking mechanism 278 for closing the lid 176 that has been opened by the pushing mechanism 276 to intermesh the first hook 184 and the second hook 190 is disposed above the support plate 252. The locking mechanism 278 is disposed on an extension of the path along which the push rod 276b is movable, for example.

The locking mechanism 278 includes a movable arm 278a that can be moved laterally by an actuator, not depicted, such as an electric motor. Specifically, the movable arm 278a is movable along the extension of the path along which the push rod 276b is movable. The movable arm 278a has a distal end, oriented toward the pushing mechanism 276, to which there are attached a pair of pressing wheels 278b usable in contact with the top plate 186 of the lid 176 and rotatable about its central axis, i.e., a rotational axis perpendicular to the directions along which the movable arm 278a is movable and the Z-axis directions.

For opening the lid 176 of the blade case 172 with the opening and closing unit 270, the support plate 252 is rotated about the rotational axis thereof to position one of the blade cases 172 over the two holding rods 272b of the holding mechanism 272. Then, the holding rods 272b are lifted to bring the suction pads 272c, from below, into contact with the bottom plate 180 of the storage casing 174 of the blade case 172.

Figure 19A:
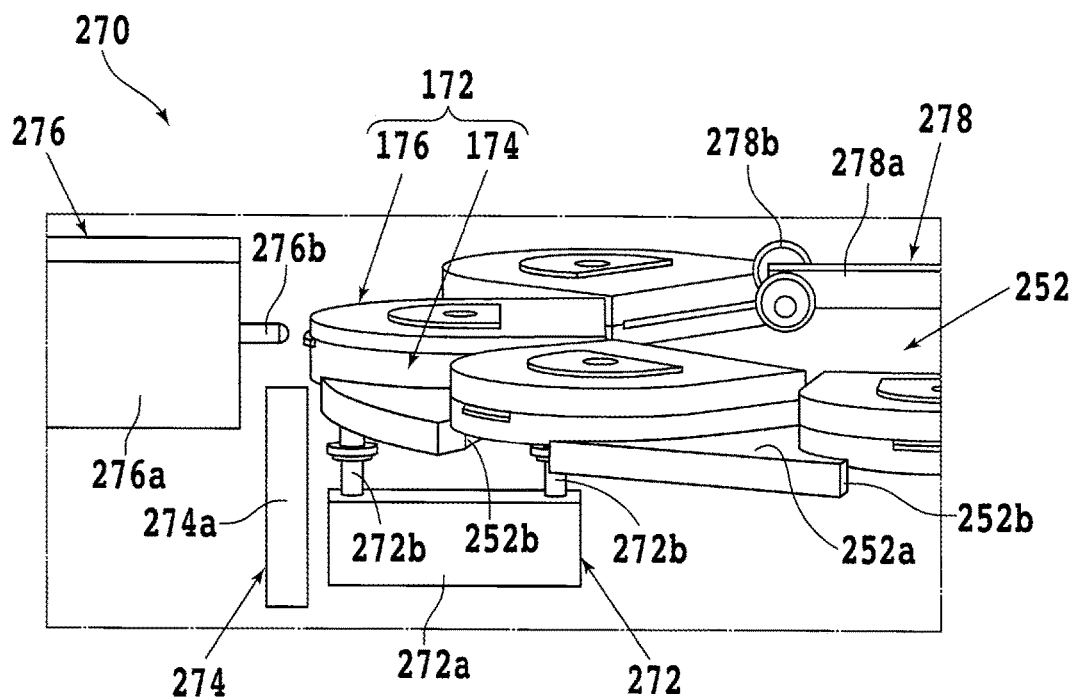
FIG. 19A is a perspective view illustrating the manner in which a blade case placed on a blade case support is secured by a holding mechanism.

FIG. 19A illustrates in perspective the manner in which the blade case 172 placed on the blade case support 254 is secured by the holding mechanism 272. After the suction pads 272c have contacted the bottom plate 180 of the storage casing 174, the suction pads 272c hold the storage casing 174 under the negative pneumatic pressure from the suction source. Each of the blade case supports 254 has a clearance, i.e., an opening, defined therein for allowing the suction pads 272c to pass therethrough.

Figure 19B:
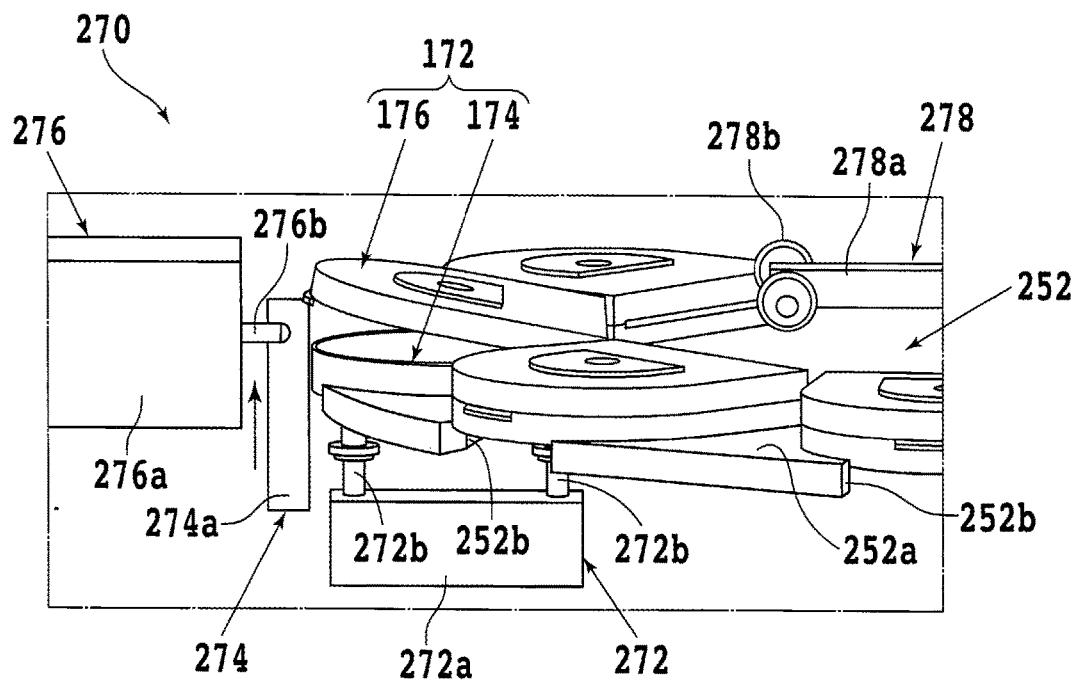
FIG. 19B is a perspective view illustrating the manner in which a lid of the blade case is pushed upwardly by an unlocking mechanism.

After the blade case 172 placed on the blade case support 254 has been secured by the holding mechanism 272, the push rod 274a of the unlocking mechanism 274 is lifted to push the second hook 190 of the lid 176 upwardly. The first hook 184 and the second hook 190 are now unlocked from each other. FIG. 19B illustrates in perspective the manner in which the lid 176 of the blade case 172 is pushed upwardly by the unlocking mechanism 274.

Figure 20A:
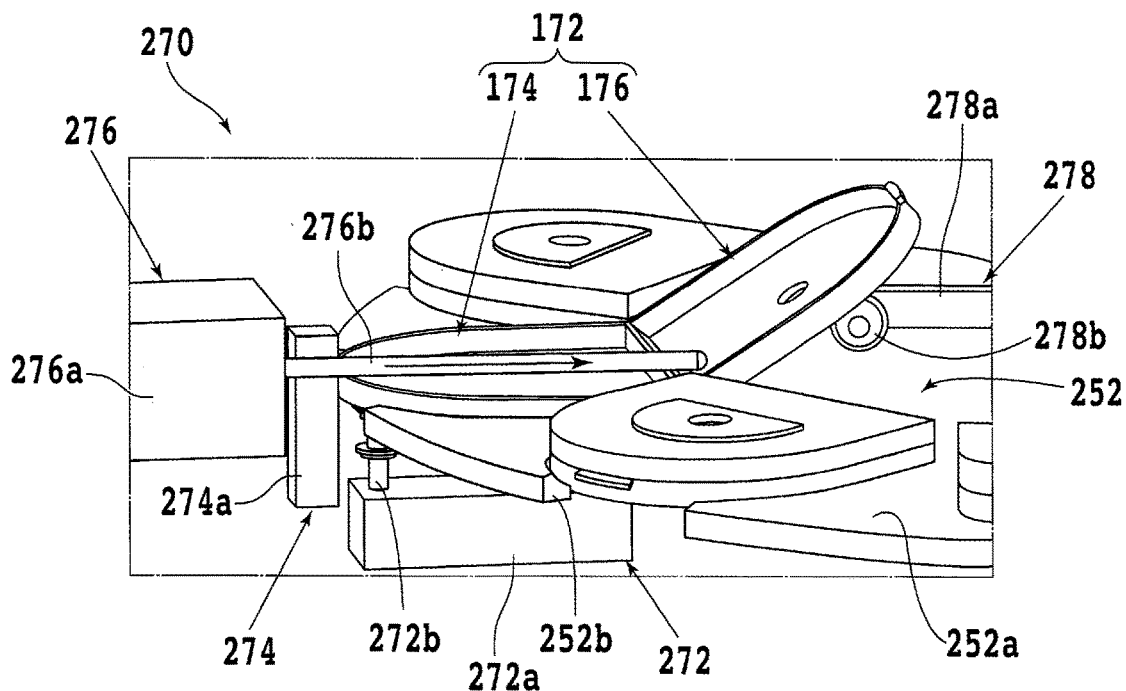
FIG. 20A is a perspective view illustrating the manner in which the lid of the blade case is further opened by a pushing mechanism.

After the lid 176 has been pushed upwardly by the unlocking mechanism 274, the push rod 276b of the pushing mechanism 276 is moved laterally to open the lid 176 further. FIG. 20A illustrates in perspective the manner in which the lid 176 of the blade case 172 is further opened by the pushing mechanism 276. Specifically, the push rod 276b is moved laterally to have its distal end push an inner surface of the top plate 186 of the lid 176, thereby further opening the lid 176, as illustrated in FIG. 20A.

After the lid 176 has been sufficiently opened, the push rod 276b is moved back from above the blade case 172. With the lid 176 being sufficiently opened, the changing device 100 can easily access the cutting blade 52 housed in the blade case 172.

For closing the lid 176 of the blade case 172 with the opening and closing unit 270, the push rod 274a of the unlocking mechanism 274 is moved downwardly, for example. The negative pneumatic pressure applied from the suction source to the suction pads 272c of the holding mechanism 272 is cut off, and the holding rods 272b are lowered. Thereafter, the movable arm 278a of the locking mechanism 278 is moved toward the pushing mechanism 276.

Figure 20B:
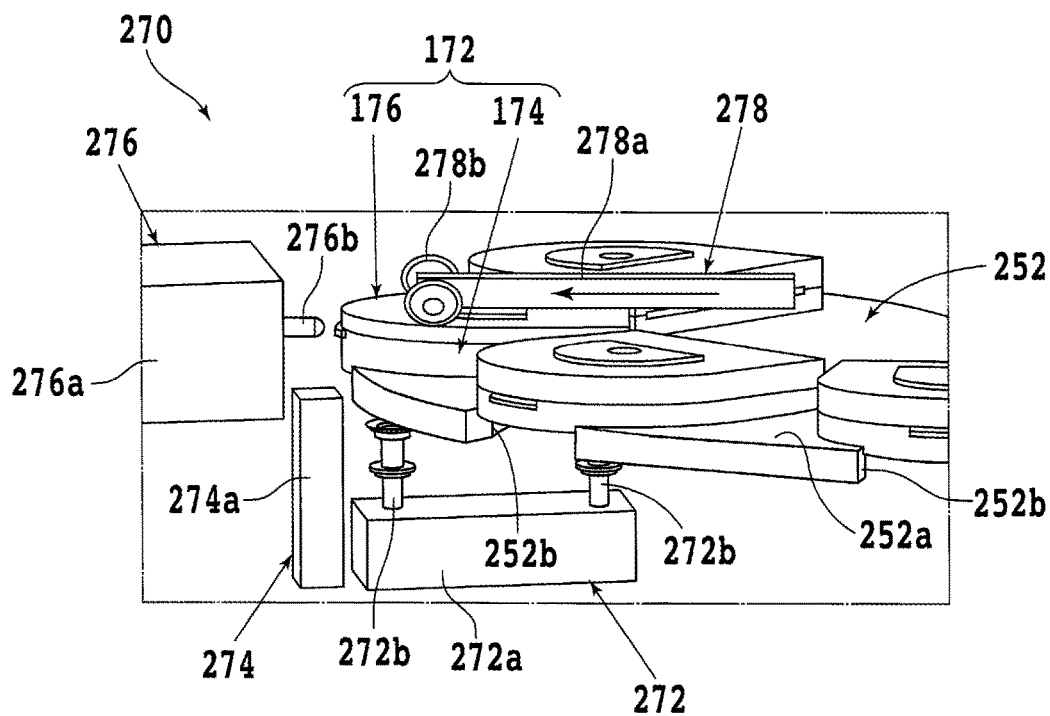
FIG. 20B is a perspective view illustrating the manner in which the lid of the blade case is closed by a locking mechanism.

FIG. 20B illustrates in perspective the manner in which the lid 176 of the blade case 172 is closed by the locking mechanism 278. When the movable arm 278a is moved toward the pushing mechanism 276, the pressing wheels 278b of the locking mechanism 278 are brought into contact with an outer surface of the top plate 186 of the lid 176. When the movable arm 278a is moved further toward the pushing mechanism 276, the pressing wheels 278b push the lid 176 toward the storage casing 174 until the lid 176 is closed over the storage casing 174, intermeshing the first hook 184 and the second hook 190.

For changing a used cutting blade 52 on one of the cutting units 30, replacement cutting blades 52 and holder flanges 62 are supported on the support unit 250. Then, the changer unit 76 holds one of the replacement cutting blades 52 and one of the holder flanges 62 that are supported on the support unit 250 with the changing device 100 (see FIG. 9B).

At this time, the control unit 82 controls the changer unit 76 on the basis of the information represented by the identification marks 214 attached to the cutting blades 52 to cause the changing device 100 to hold one of the cutting blades 52 and one of the holder flanges 62. Accordingly, a desired cutting blade 52 on the support unit 250 can be selected as a replacement cutting blade 52. Thereafter, the used cutting blade 52 and the used holder flange 62 that are mounted on the cutting unit 30 are replaced with the replacement cutting blade 52 and the holder flange 62 from the changing device 100 (see FIGS. 12A through 13D).

Similarly, for changing a used dressing board 19 or a used inspection board 21 on one of the sub-tables 26, a replacement dressing board 19 or a replacement inspection board 21 are supported on the support unit 250. The changer unit 76 holds the replacement dressing board 19 or the replacement inspection board 21 supported on the support unit 250, and replaces the used dressing board 19 or the used inspection board 21 on the sub-table 26 with the replacement dressing board 19 or the replacement inspection board 21 from the support unit 250 (see FIGS. 15A through 16D).

The structural details and process details according to the above embodiment and modifications may be changed or modified without departing from the scope of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A cutting apparatus comprising:
   a cutting unit including a spindle as a rotational shaft and a mount flange for mounting a first cutting blade thereon, the mount flange being fixed to a distal end of the spindle;

a plate-shaped support unit for supporting a plurality of further cutting blades, each cutting blade of the plurality of further cutting blades being housed in a respective one of a plurality of blade cases, the plate-shaped support unit including a plurality of blade case supports, each blade case support supporting a respective one blade case of the plurality of blade cases, wherein each blade case of the plurality of blade cases has a respective storage casing for storing a respective one of the plurality of further cutting blades and has a respective openable and closable lid for closing the corresponding storage casing;

a changing mechanism for dismounting the first cutting blade that has been mounted on the mount flange from the mount flange and mounting one of the plurality of further cutting blades that has been supported on the plate-shaped support unit on the mount flange; and a moving mechanism for moving the changing mechanism between a changing position in which the first cutting blade is able to be mounted on and dismounted from the mount flange, a blade transfer position in which one of the plurality of further cutting blades is able to be transferred to and from the plate-shaped support unit, and a retracted position spaced from the changing position and the blade transfer position.

2. The cutting apparatus according to claim 1, wherein the plate-shaped support unit further includes a rotating mechanism for rotating the blade case supports, the blade case supports being arrayed along directions in which the blade case supports are rotatable by the rotating mechanism.

3. The cutting apparatus according to claim 1, wherein the mount flange has a fixed mount fixed to the spindle and a holder flange mounted on the fixed mount with the first cutting blade sandwiched and secured between the fixed mount and the holder flange, the plate-shaped support unit further includes a holder flange support for supporting the holder flange, and the changing mechanism mounts the first cutting blade together with the holder flange on the fixed mount and dismounts the first cutting blade together with the holder flange from the fixed mount.

4. The cutting apparatus according to claim 1, the cutting apparatus further includes an opening and closing unit for opening and closing the lid of each of the plurality of blade cases.

5. The cutting apparatus according to claim 1, further comprising:

a table for holding a dressing board for use in dressing the first cutting blade or an inspection board for being cut by the first cutting blade to form an inspection groove therein, wherein the plate-shaped support unit further includes a board support for supporting the dressing board or the inspection board, the moving mechanism moves the changing mechanism between a board transfer position in which the dressing board or the inspection board is able to be transferred to and from the plate-shaped support unit, a loading and unloading position in which the dressing board or the inspection board is able to be loaded to and unloaded from the table, the changing position, the blade transfer position, and the retracted position, and the changing mechanism removes the dressing board or the inspection board from the table on which the dressing board or the inspection board has been held, and places, on the table, the dressing board or the inspection board that has been supported on the plate-shaped support unit.

6. The cutting apparatus according to claim 5, wherein a respective identification mark is attached to each blade of the plurality of further blades, the cutting apparatus further comprising:

a reading unit for reading identification marks; and a board determining unit for determining whether information acquired when one of the identification marks attached to one of the further cutting blades is read by the reading unit and information acquired when an identification mark attached to the dressing board or the inspection board is read by the reading unit correspond to each other or not.

7. The cutting apparatus according to claim 6, wherein a respective identification mark is attached to each of the blade cases of the plurality of blade cases, the cutting apparatus further comprising:

a blade case determining unit for determining whether information acquired when one of the identification marks attached to one of the further cutting blades is read by the reading unit and information acquired when one of the identification marks attached to one of the blade cases of the plurality of blade cases is read by the reading unit correspond to each other or not.

8. The cutting apparatus according to claim 1, wherein a respective identification mark is attached to each blade of the plurality of further blades, and wherein a respective identification mark is attached to each of the blade cases of the plurality of blade cases, the cutting apparatus further comprising:

a reading unit for reading identification marks; and a blade case determining unit for determining whether information acquired when one of the identification marks attached to one of the further cutting blades is read by the reading unit and information acquired when one of the identification marks attached to one of the blade cases of the plurality of blade cases is read by the reading unit correspond to each other or not.

9. The cutting apparatus according to claim 1, wherein the mount flange has a fixed mount fixed to the spindle and a holder flange mounted on the fixed mount with the first cutting blade sandwiched and secured between the fixed mount and the holder flange, and the changing mechanism includes a holder for holding either the first cutting blade or the second cutting blade as well as the holder flange.

10. The cutting apparatus according to claim 1, wherein the changing mechanism comprises:

a frame;

a first holder for holding either the first cutting blade or one of the plurality of further cutting blades;

a second holder, disposed opposite to the first holder on the frame; and a nut turner, wherein the first holder and the second holder are angularly spaced 90 degrees from the nut turner around the rotational axis of the changing mechanism.

11. The cutting apparatus according to claim 10, wherein the frame further comprises:

a pair of plate-shaped support members;

a pair of coupling members disposed between and connecting the support members; and an annular housing disposed between the support members which lies generally parallel to the support members.

12. The cutting apparatus according to claim 11, wherein the annular member is coupled to the support members by a plurality of resilient members, such that the annular member is suspended by the resilient members and held out of contact with the support members.

13. The cutting apparatus according to claim 1, wherein each of the storage casings is coupled to a respective one of the lids by a respective hinge.

14. The cutting apparatus according to claim 13, wherein each of the storage casings includes a respective first hook and each of the lids includes a respective second hook, such that when each of the first hooks intermesh with a corresponding one of the second hooks, each blade case of the plurality of blade cases is placed in a locked state.

15. The cutting apparatus according to claim 1, wherein each of the storage casings includes a respective bottom plate and a respective side wall extending along a respective outer peripheral edge of the corresponding bottom plate.

16. The cutting apparatus according to claim 1, wherein each of the blade case supports includes a respective guide structure shaped complementarily to a corresponding one of the blade cases of the plurality of blade cases.

17. The cutting apparatus according to claim 1, wherein each of the blade case supports includes a respective recessed region shaped complementarily to a corresponding one of the blade cases of the plurality of blade cases.

18. A cutting apparatus comprising:
a cutting unit including a spindle as a rotational shaft and a mount flange for mounting a first cutting blade thereon, the mount flange being fixed to a distal end of the spindle;
a support unit for supporting a second cutting blade housed in a blade case, the support unit including a blade case support for supporting the blade case for housing the second cutting blade therein;
a changing mechanism for dismounting the first cutting blade that has been mounted on the mount flange from the mount flange and mounting the second cutting blade that has been supported on the support unit on the mount flange;
a moving mechanism for moving the changing mechanism between a changing position in which the first cutting blade is able to be mounted on and dismounted from the mount flange, a blade transfer position in which the second cutting blade is able to be transferred to and from the support unit, and a retracted position spaced from the changing position and the blade transfer position;
a reading unit for reading identification marks; and
a blade case determining unit for determining whether information acquired when an identification mark attached to the second cutting blade is read by the reading unit and information acquired when an identification mark attached to the blade case is read by the reading unit correspond to each other or not.

19. A cutting apparatus comprising:
a cutting unit including a spindle as a rotational shaft and a mount flange for mounting a first cutting blade thereon, the mount flange being fixed to a distal end of the spindle;
a support unit for supporting a second cutting blade housed in a blade case, the support unit including a blade case support for supporting the blade case for housing the second cutting blade therein;
a changing mechanism for dismounting the first cutting blade that has been mounted on the mount flange from the mount flange and mounting the second cutting blade that has been supported on the support unit on the mount flange;
a moving mechanism for moving the changing mechanism between a changing position in which the first cutting blade is able to be mounted on and dismounted from the mount flange, a blade transfer position in which the second cutting blade is able to be transferred to and from the support unit, and a retracted position spaced from the changing position and the blade transfer position;
a table for holding a dressing board for use in dressing the first cutting blade or an inspection board for being cut by the first cutting blade to form an inspection groove therein,
wherein the support unit further includes a board support for supporting the dressing board or the inspection board,
wherein the moving mechanism moves the changing mechanism between a board transfer position in which the dressing board or the inspection board is able to be transferred to and from the support unit, a loading and unloading position in which the dressing board or the inspection board is able to be loaded to and unloaded from the table, the changing position, the blade transfer position, and the retracted position, and
wherein the changing mechanism removes the dressing board or the inspection board from the table on which the dressing board or the inspection board has been held, and places, on the table, the dressing board or the inspection board that has been supported on the support unit;
a reading unit for reading identification marks;
a board determining unit for determining whether information acquired when an identification mark attached to the second cutting blade is read by the reading unit and information acquired when an identification mark attached to the dressing board or the inspection board is read by the reading unit correspond to each other or not; and
a blade case determining unit for determining whether information acquired when an identification mark attached to the second cutting blade is read by the reading unit and information acquired when an identification mark attached to the blade case is read by the reading unit correspond to each other or not.

* * * * *